United States Patent
Chen et al.

(10) Patent No.: US 11,803,441 B2
(45) Date of Patent: Oct. 31, 2023

(54) CALIBRATED DECODERS FOR IMPLEMENTATIONS OF QUANTUM CODES

(71) Applicant: International Business Machines Corporation, Armonk, NY (US)

(72) Inventors: Edward Hong Chen, San Jose, CA (US); Andrew W. Cross, Yorktown Heights, NY (US); Youngseok Kim, Upper Saddle River, NJ (US); Neereja Sundaresan, Mount Kisco, NY (US); Maika Takita, Croton-on-Hudson, NY (US); Antonio Corcoles-Gonzalez, Mount Kisco, NY (US); Theodore James Yoder, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 17/490,364

(22) Filed: Sep. 30, 2021

(65) Prior Publication Data
US 2023/0094612 A1 Mar. 30, 2023

(51) Int. Cl.
G06F 11/00 (2006.01)
G06F 11/10 (2006.01)
(Continued)

(52) U.S. Cl.
CPC .......... G06F 11/1012 (2013.01); G06F 17/18 (2013.01); G06N 10/00 (2019.01)

(58) Field of Classification Search
CPC ..... G06F 11/1012; G06F 17/18; G06N 10/00; G06N 10/20; G06N 10/70
See application file for complete search history.

(56) References Cited

U.S. PATENT DOCUMENTS

2019/0392342 A1\* 12/2019 Leipold ................. G06N 99/00
2021/0042652 A1\* 2/2021 Das ......................... G06N 10/00
(Continued)

FOREIGN PATENT DOCUMENTS

| CN | 1291562 C | 12/2006 |
| CN | 100376926 C | 3/2008 |

(Continued)

OTHER PUBLICATIONS

Chen, Z. et al., "Exponential suppression of bit or phase flip errors with repetitive error correction," arxiv.org, Cornell University Library, published: Feb. 11, 2021, accessed online on Mar. 1, 2023 at URL: https://arxiv.org/abs/2102.06132. (Year: 2021).\*

(Continued)

*Primary Examiner* — Albert Decady
*Assistant Examiner* — Enamul M Kabir
(74) *Attorney, Agent, or Firm* — Amin, Turocy & Watson, LLP

(57) ABSTRACT

Techniques regarding calibrating one or more quantum decoder algorithms are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a correlation inversion decoder component that can calibrate a quantum decoder algorithm for decoding a quantum error-correcting code by estimating hyperedge probabilities of a decoding hypergraph that are consistent with a syndrome dataset.

23 Claims, 16 Drawing Sheets

(51) Int. Cl.
    *G06N 10/00*    (2022.01)
    *G06F 17/18*    (2006.01)

(56) References Cited

U.S. PATENT DOCUMENTS

| | | | |
|---|---|---|---|
| 2021/0272003 | A1 | 9/2021 | Tyler et al. |
| 2021/0304053 | A1* | 9/2021 | Pant .................... G06N 3/08 |
| 2022/0253742 | A1* | 8/2022 | Zheng .................. G06N 3/045 |
| 2022/0269963 | A1* | 8/2022 | Delfosse ............. G06F 16/9024 |
| 2022/0292385 | A1* | 9/2022 | Sauvage ............... G06N 3/084 |

FOREIGN PATENT DOCUMENTS

| | | |
|---|---|---|
| CN | 103746711 B | 3/2015 |
| CN | 103873074 B | 5/2016 |
| CN | 110518920 A | 11/2019 |
| CN | 111510158 A | 8/2020 |
| CN | 112654970 A | 4/2021 |
| CN | 112734043 A | 4/2021 |
| CN | 108270451 B | 6/2021 |
| CN | 112988451 A | 6/2021 |
| CN | 112990470 A | 6/2021 |
| EP | 3043508 B1 | 6/2019 |
| JP | 3726133 B2 | 12/2005 |
| TW | I534617 B | 5/2016 |

OTHER PUBLICATIONS

L. Riesebos, X. Fu, S. Varsamopoulos, C. G. Almudeverand K. Bertels, "Pauli frames for quantum computer architectures," 2017 54th ACM/EDAC/IEEE Design Automation Conference (DAC), Austin, TX, USA, 2017, pp. 1-6, doi: 10.1145/3061639.3062300. (Year: 2017).*
Office Action received for Taiwan Patent Application Serial No. 11220026310 dated Jan. 10, 2023, 09 pages.
D. Aharonov and M. Ben-Or, Fault-Tolerant Quantum Computation with Constant Error Rate, SIAM Journal on Computing 38, 1207 (2008).
E. Knill, R. Laflamme, and W. Zurek, Threshold accuracy for quantum computation, Preprint at https://arxiv.org/abs/quant-ph/9610011 (1996).
D. E. Gottesman, Stabilizer Codes and Quantum Error Correction, Ph.D. thesis, California Institute of Technology (1997).
P.W. Shor, Scheme for reducing decoherence in quantum computer memory, Physical Review A 52, R2493 (1995).
E. Knill and R. Laflamme, Theory of quantum errorcorrecting codes, Physical Review A 55, 900 (1997).
P. Iyer and D. Poulin, A small quantum computer is needed to optimize fault-tolerant protocols, Quantum Science and Technology 3, 030504 (2018).
O. Moussa, J. Baugh, C. A. Ryan, and R. Laflamme, Demonstration of sufficient control for two rounds of quantum error correction in a solid state ensemble quantum information processor, Physical Review Letters 107, 160501 (2011).
J. Zhang, D. Gangloff, O. Moussa, and R. Laflamme, Experimental quantum error correction with high fidelity, Phys. Rev. A 84, 034303 (2011).
P. Schindler, J. T. Barreiro, T. Monz, V. Nebendahl, D. Nigg, M. Chwalla, M. Hennrich, and R. Blatt, Experimental repetitive quantum error correction, Science 332, 1059 (2011).
G. Waldherr, Y. Wang, S. Zaiser, M. Jamali, T. Schulte-Herbr¨uggen, H. Abe, T. Ohshima, J. Isoya, J. Du, P. Neumann, et al., Quantum error correction in a solid-state hybrid spin register, Nature 506, 204 (2014).
X. Xue, M. Russ, N. Samkharadze, B. Undseth, A. Sammak, G. Scappucci, and L. M. K. Vandersypen, Computing with spin qubits at the surface code error threshold arXiv:2107.00628 [cond-mat, physics:quant-ph] (2021), arXiv:2107.00628 [cond-mat, physics:quant-ph].

K. Takeda, J. Kamioka, T. Otsuka, J. Yoneda, T. Nakajima, M. R. Delbecq, S. Amaha, G. Allison, T. Kodera, S. Oda, el al., A fault-tolerant addressable spin qubit in a natural silicon quantum dot, Science advances 2, e1600694 (2016).
G. Waldherr, Y. Wang, S. Zaiser, M. Jamali, T. Schulte-Herbr¨uggen, H. Abe, T. Ohshima, J. Isoya, J. F. Du, P. Neumann, and J. Wrachtrup, Quantum error correction in a solid-state hybrid spin register, Nature 506, 204 (2014).
J. Cramer, N. Kalb, M. A. Rol, B. Hensen, M. S. Blok, M. Markham, D. J. Twitchen, R. Hanson, and T. H. Taminiau, Repeated quantum error correction on a continuously encoded qubit by real-time feedback, Nature Communications 7, 11526 (2016).
A. D. Corcoles, M. Takita, K. Inoue, S. Lekuch, Z. K. Minev, J. M. Chow, and J. M. Gambetta, Exploiting dynamic quantum circuits in a quantum algorithm with superconducting qubits, arXiv:2102.01682 [quantph] (2021), arXiv:2102.01682 [quant-ph].
C. K. Andersen, A. Remm, S. Lazar, S. Krinner, N. Lacroix, G. J. Norris, M. Gabureac, C. Eichler, and A. Wallraff, Repeated quantum error detection in a surface code, Nature Physics 16, 875 (2020).
J. F. Marques, B. M. Varbanov, M. S. Moreira, H. Ali, N. Muthusubramanian, C. Zachariadis, F. Battistel, M. Beekman, N. Haider, W. Vlothuizen, A. Bruno, B. M. Terhal, and L. DiCarlo, Logical-qubit operations in an error-detecting surface code (2021), arXiv:2102.13071 [quant-ph].
G. Q. Al, Exponential suppression of bit or phase errors with cyclic error correction, Nature 595, 383 (2021).
M. Takita, A. D. C'orcoles, E. Magesan, B. Abdo M. Brink, A. Cross, J. M. Chow, and J. M. Gambetta, Demonstration of weight-four parity measurements in the surface code architecture, Phys. Rev. Lett. 117, 210505 (2016).
J. B. Hertzberg, E. J. Zhang, S. Rosenblatt, E. Magesan, J. A. Smolin, J.-B. Yau, V. P. Adiga, M. Sandberg, M. Brink, J. M. Chow, et al., Laser-annealing josephson junctions for yielding scaled-up superconducting quantum processors, npj Quantum Information 7, 1 (2021).
E. J. Zhang, S. Srinivasan, N. Sundaresan, D. F. Bogorin, Y. Martin, J. B. Hertzberg, J. Timmerwilke, E. J. Pritchett, J.-B. Yau, C.Wang, W. Landers, E. P. Lewandowski, A. Narasgond, S. Rosenblatt, G. A. Keefe, I. Lauer, M. B. Rothwell, D. T. McClure, O. E. Dial, J. S. Orcutt, M. Brink, and J. M. Chow, High-fidelity superconducting quantum processors via laser-annealing of transmon qubits (2020), arXiv:2012.08475 [quant-ph].
R. Chao and B. W. Reichardt, Quantum Error Correction with Only Two Extra Qubits, Physical Review Letters 121, 050502 (2018).
C. Chamberland andM. E. Beverland, Flag fault-tolerant error correction with arbitrary distance codes, Quantum 2, 53 (2018).
C. Chamberland, G. Zhu, T. J. Yoder, J. B. Hertzberg, and A. W. Cross, Topological and subsystem codes on low-degree graphs with flag qubits. Physical Review X 10, 011022 (2020), arXiv:1907.09528.
O. Higgott and N. P. Breuckmann, Subsystem codes with high thresholds by gauge fixing and reduced qubit overhead, Physical Review X 11, 031039 (2021).
P. Das, A. Locharia, and C. Jones, Lilliput: A lightweight low-latency lookup-table based decoder for near-term quantum error correction, arXiv preprint arXiv:2108.06569 (2021).
S. Bravyi, M. Suchara, and A. Vargo, Efficient algorithms for maximum likelihood decoding in the surface code, Physical Review A 90, 032326 (2014).
S. Bravyi and A. Cross, Doubled color codes, arXiv reprint arXiv:1509.03239 (2015).
B. Heim, K. M. Svore, and M. B. Hastings, Optimal circuit-level decoding for surface codes, arXiv preprint arXiv:1609.06373 (2016).
Qiskit: An open-source framework for quantum computing (2021).
S. Bravyi, S. Sheldon, A. Kandala, D. C. Mckay, and J. M. Gambetta, Mitigating measurement errors in multiqubit experiments, Physical Review A 103, 042605 (2021).
M. Takita, A. W. Cross, A. D. C'orcoles, J. M. Chow, and J. M. Gambetta, Experimental demonstration of faulttolerant state preparation with superconducting qubits, Phys. Rev. Lett. 119, 180501 (2017).
S. Garion, N. Kanazawa, H. Landa, D. C.McKay, S. Sheldon, A. W. Cross, and C. J. Wood, Experimental implementation of non-clifford

(56) References Cited

OTHER PUBLICATIONS interleaved randomized benchmarking with a controlled-s gate, Phys. Rev. Research 3, 013204 (2021).
C. Gidney, Decorrelated depolarization, accessed: Aug. 23, 2021.
R. Chao, M. E. Beverland, N. Delfosse, and J. Haah, Optimization of the surface code design for Majoranabased qubits, Quantum 4, 352 (2020).
E. Jeffrey, D. Sank, J. Mutus, T. White, J. Kelly, R. Barends, Y. Chen, Z. Chen, B. Chiaro, A. Dunsworth, A. Megrant, P. O'Malley, C. Neill, P. Roushan, A. Vainsencher, J. Wenner, A. Cleland, and J. M. Martinis, Fast accurate state measurement with superconducting qubits, Physical Review Letters 101, 080502 (2008).
M. D. Reed, B. R. Johnson, A. A. Houck, L. DiCarlo, J. M. Chow, D. I. Schuster, L. Frunzio, and R. J. Schoelkopf, Fast reset and suppressing spontaneous emission of a superconducting qubit, Applied Physics Letters 96, 203110 (2010).
N. Sundaresan, I. Lauer, E. Pritchett, E. Magesan, P. Jurcevic, and J. M. Gambetta, Reducing Unitary and Spectator Errors in Cross Resonance with Optimized Rotary Echoes, PRX Quantum 1, 020318 (2020).
Dennis, et al., "Topological quantum memory," J. Math. Phys. 43, 4452-4505 (2002), DOI: 10.1063/1.1499754.
Nickerson, et al., "Analysing correlated noise on the surface code using adaptive decoding algorithms," Quantum 3, 131 (2019), DOI: 10.22331/q-2019-04-08-131.
Criger, et al., "Multi-path Summation for Decoding 2D Topological Codes," Quantum 2, 102 (2018), DOI: 10.22331/q-2018-10-19-102.
Higgott, et al., "Subsystem codes with high thresholds by gauge fixing and reduced qubit overhead," Phys. Rev. X 11, 031039 (2021), DOI: 10.1103/PhysRevX.11.031039.
Delfosse, et al., "Almost-linear time decoding algorithm for topological codes," arXiv:1709.06218v1 [quant-ph] Sep. 19, 2017.
Bravyi, et al., "Efficient Algorithms for Maximum Likelihood Decoding in the Surface Code," Phys. Rev. A 90, 032326 (2014), DOI: 10.1103/PhysRevA.90.032326.
Chubb, et al., "Statistical mechanical models for quantum codes with correlated noise," Annales de L'Institut Henri Poincaré D, 8 (2) 269-321 (2021), DOI: 10.4171/AIHPD/105.
Heim, et al., "SOptimal Circuit-Level Decoding for Surface Codes," arXiv:1609.06373v1 [quant-ph] Sep. 20, 2016.
Maskara, et al., "Advantages of versatile neural-network decoding for topological codes," Phys. Rev. A 99, 052351 (2019), DOI: 10.1103/PhysRevA.99.052351.
Chamberland, et al., "Deep neural decoders for near term fault-tolerant experiments," Quantum Science and Technology, vol. 3, No. 4, p. 044002, (2018), DOI: 10.1088/2058-9565/aad1f7.
Takita, et al., "Experimental demonstration of fault-tolerant state preparation with superconducting qubits," Phys. Rev. Lett. 119, 180501 (2017), DOI: 10.1103/PhysRevLett.119.180501.
Ryan-Anderson, et al., "Realization of real-time fault-tolerant quantum error correction," arXiv:2107.07505v1 [quant-ph] Jul. 15, 2021.
Chen, et al., "Exponential suppression of bit or phase flip errors with repetitive error correction," arXiv:2102.06132v1 [quant-ph] Feb. 11, 2021.
Chamberland, et al., "Topological and Subsystem Codes on Low-Degree Graphs with Flag Qubits," Phys. Rev. X 10, 011022—Published Jan. 31, 2020.
Mell et al., The NIST Definition of Cloud Computing, Recommendations of the National Institute of Standards and Technology, NIST Special Publication 800-145, Sep. 2011, 7 pages.
International Search Report and Written Opinion for International Application No. PCT/EP2022/070954 dated Nov. 24, 2022.
Chen, et al., "Exponential suppression of bit or phase ip errors with repetitive error correction," arxiv.org, Cornell University Library, 201 Olin Library Cornell University Ithaca, NY 14853, Feb. 11, 2021 (Feb. 11, 2021), XP081881411, the whole document.
Hu, et al., "Fine Granularity Clustering for Large Scale Placement Problems," Proceedings of 2003 International Symposium on Physical Design. ISPD '03. Monterey, CA, Apr. 6-9, 2003; [Proceedings of 2003 International Symposium on Physical Design], New York, NY : ACM, US, Apr. 6, 2003 (Apr. 6, 2003), pp. 67-74, XP058252453, DOI 10.1145/640000.640017, abstract, section 4.5; pp. 70-71; fig 5.

\* cited by examiner

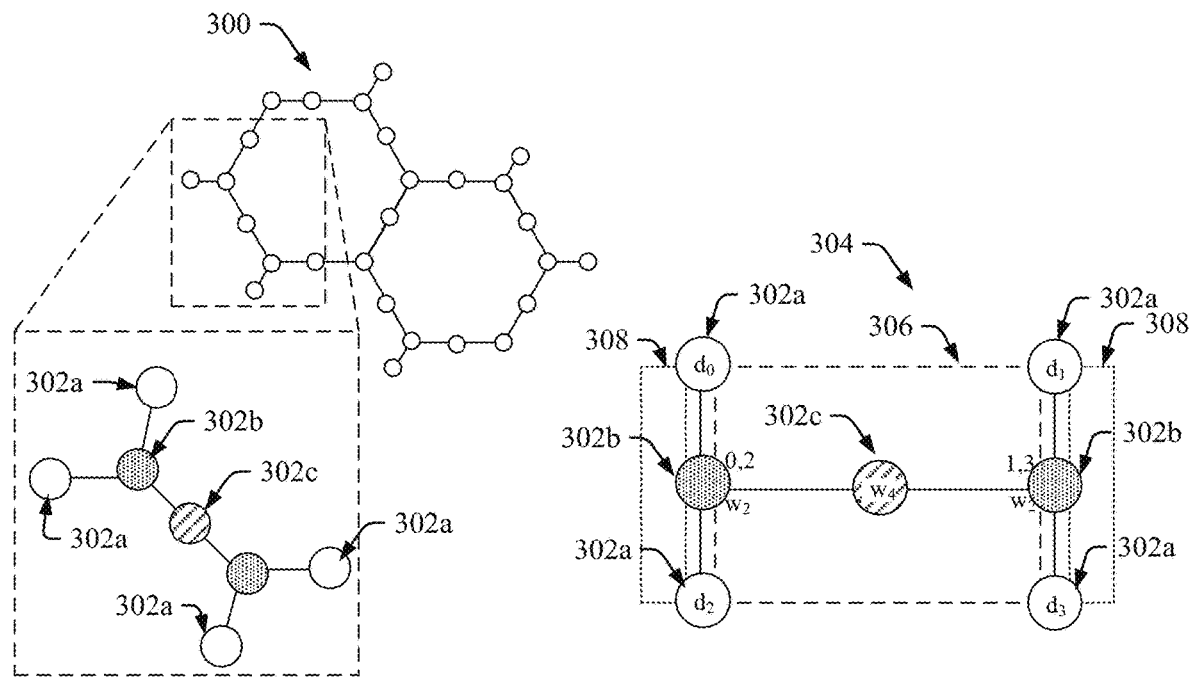
FIG. 3A
FIG. 3B
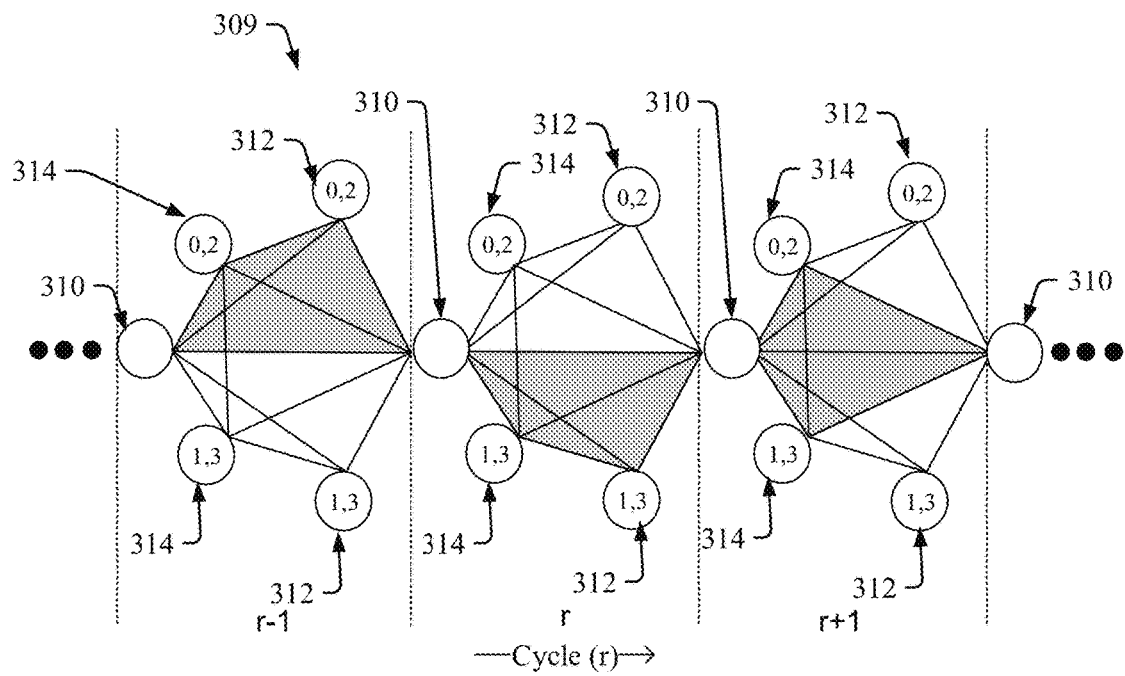
FIG. 3C

```
         #errors      #events  standard              tuned
p-edge  q-edge        total    fail  fprob           fail  fprob
0       0             1        0     0.00000000      0     0.00000000
1       0             9        0     0.00000000      0     0.00000000
0       1             6        0     0.00000000      0     0.00000000
2       0             36       19    0.01762844      18    0.01670063   Dominant
1       1             54       10    0.01958716      10    0.01958716   error terms
0       2             15       0     0.00000000      0     0.00000000
... higher order terms not shown...
                                     0.06912346            0.06881932   Total failure
                                                                        probability
```

CALIBRATED DECODERS FOR IMPLEMENTATIONS OF QUANTUM CODES

STATEMENT REGARDING FEDERALLY SPONSORED RESEARCH OR DEVELOPMENT

This invention was made with Government support under Contract No.: W911NF-16-1-0114 awarded by Intelligence Advanced Research Projects Activity (IARPA). The Government has certain rights in this invention.

BACKGROUND

The subject disclosure relates to decoding algorithms for topological quantum codes, and more specifically, to correlation inversion decoders and/or tuned analytic decoders that can determine one or more edge probabilities of a decoding graph.

Preparing and preserving logical quantum states is practiced for performing long quantum computations. Unavoidable noise can inevitably corrupt the underlying physical qubits, thereby decoders can employ one or more quantum decoding algorithms to decode quantum error correction (QEC) code; thereby detecting and/or recovering from errors. Further, the development of high fidelity mid-circuit measurements and/or resets of superconducting qubits have enabled the preparation and repeated stabilization of logical states.

Decoding algorithms can utilize a decoding graph to track and/or map error-sensitive events associated with a syndrome extraction circuit defined by the QEC code. However, the efficiency of the decoding algorithms can be dependent on the edge weights assigned to the decoding graph, where the edge weights can characterize the probability of a represented Pauli error. In particular, typical Pauli error models used to determine the decoding graph edge weights can fail to capture noise exposed to quantum circuits during the quantum computations.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can determine hyperedge probabilities of one or more decoding graphs are described.

According to an embodiment, a system is provided. The system can comprise a memory that stores computer executable components. The system can also comprise a processor, operably coupled to the memory, and that can execute the computer executable components stored in the memory. The computer executable components can comprise a correlation inversion decoder component that can calibrate a quantum decoder algorithm for a quantum error-correcting code by estimating hyperedge probabilities of a decoding hypergraph that are consistent with a syndrome dataset. The hyperedge probabilities can represent correlated triggers of one or more quantum circuit faults. An advantage of such a system can be the implementation of a decoding algorithm that can capture experiment noise introduced to a quantum circuit during implementation of a quantum algorithm.

In some examples, the system can further comprise a cluster component that can sort a plurality of hyperedges represented in the decoding hypergraph into clusters based on size. An advantage of such a system can be the utilization of decoding algorithms on a simplified set of faults.

According to another embodiment, a system is provided. The system can comprise a memory that stores computer executable components. The system can also comprise a processor, operably coupled to the memory, and that can execute the computer executable components stored in the memory. The computer executable components can comprise a tuned analytic decoder component that can tune a quantum decoder algorithm for a quantum error-correcting code by tracing single Pauli faults through a quantum circuit to determine an edge probability of a decoding graph as a function of a logical error rate. An advantage of such a system can be the enabled optimization of decoding topological quantum codes.

In some examples, the system can further comprise a parameterization component that parameterizes Pauli noise present in a syndrome extraction circuit. An advantage of such a system can be selective parameterization of one or more characteristics of a decoding graph employed by a quantum decoder algorithm.

According to an embodiment, a computer-implemented method is provided. The computer-implemented method can comprise calibrating, by a system operatively coupled to a processor, a quantum decoder algorithm for a quantum error-correcting code by estimating hyperedge probabilities of a decoding hypergraph that are consistent with a syndrome dataset. The hyperedge probabilities can represent correlated triggers of one or more quantum circuit faults. An advantage of such a computer-implemented method can be the enablement of second-order corrections with regards to large error rates.

In some examples, the computer-implemented method can further comprise sorting, by the system, a plurality of hyperedges represented in the decoding hypergraph into clusters based on size. An advantage of such a computer-implemented method can be the further adjustment of hyperedge probabilities based on hyper edge geometries within the decoding graph.

According to another embodiment, a computer-implemented method is provided. The computer-implemented method can comprise tuning, by a system operatively coupled to a processor, a quantum decoder algorithm for a quantum error-correcting code by tracing single Pauli faults through a quantum circuit to determine an edge probability of a decoding graph as a function of a logical error rate. An advantage of such a computer-implemented method can be improved accuracy in decoding faults in quantum algorithms implemented during one or more experiments on a quantum circuit.

In some examples, the computer-implemented method can further comprise tuning, by the system, the parameterization by employing an optimization algorithm that can minimize a logical error rate after decoding. An advantage of such a computer-implemented method can be the tuning of a minimum-weight perfect-matching decoder.

According to an embodiment, a computer program product for calibrating a quantum decoder is provided. The computer program product can comprise a computer readable storage medium having program instructions embodied therewith. The program instructions can be executable by a processor to cause the processor to calibrate, by the processor, a quantum decoder algorithm for a quantum error-correcting code by estimating hyperedge probabilities of a decoding graph that are consistent with a syndrome dataset. The hyperedge probabilities can represent correlated triggers of one or more quantum circuit faults. An advantage of such a computer program product can be calibration of one or more decoding graphs, which can be employed by a variety of quantum decoder algorithms.

In some examples, the program instructions can further cause the processor to sort a plurality of hyperedges represented in the decoding graph into clusters based on size. Further, the program instructions can cause the processor to determine a probability associated with the plurality of hyperedges based on the sorting of the plurality of hyperedges. An advantage of such a computer program product can be the efficient use of computation resources on the sorted plurality of hyperedges.

BRIEF DESCRIPTION OF THE DRAWINGS

FIGS. 3A-3C illustrate diagrams of an example, non-limiting, topology, code layout, and/or decoding graph that can be analyzed by a correlation inversion decoder component to determine one or more hyperedge probabilities characterizing one or more error-sensitive events in accordance with one or more embodiments described herein.

DETAILED DESCRIPTION

Figure 1:
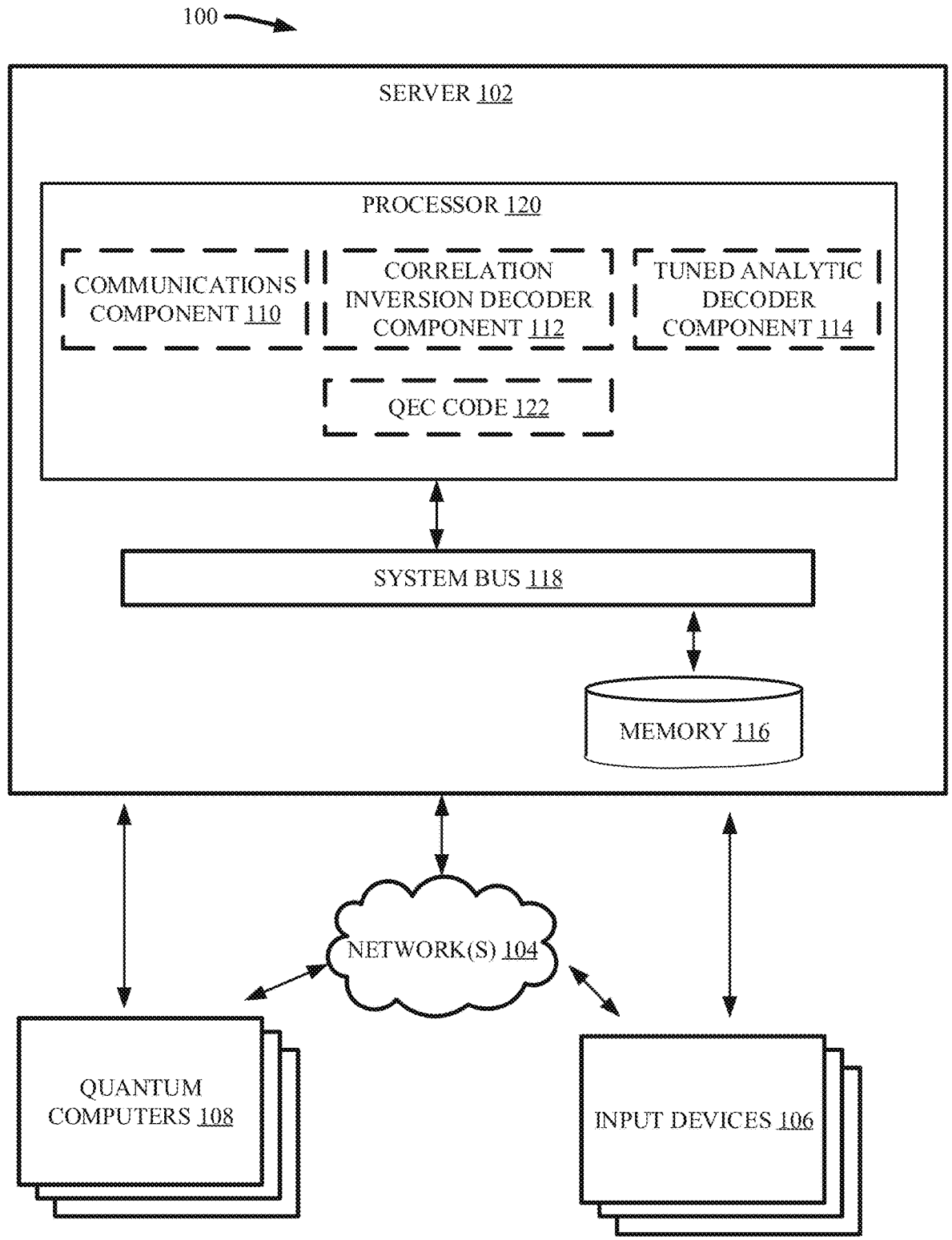
FIG. 1 illustrates a block diagram of an example, non-limiting, system that can determine edge probabilities for one or more decoding graphs in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of Pauli error modeling; the present disclosure can be implemented to produce a solution to one or more of these problems by employing correlation inversion decoders and/or tuned analytic decoders to estimate edge probabilities of a decoding graph. Advantageously, one or more embodiments described herein can facilitate tuning one or more quantum decoder algorithms to account for noise introduced to quantum circuits during the execution of one or more quantum experiments.

Various embodiments of the present invention can be directed to computer processing systems, computer-implemented methods, apparatus and/or computer program products that facilitate the efficient, effective, and autonomous (e.g., without direct human guidance) tuning of one or more quantum decoder algorithms. For example, one or more embodiments described herein can calibrate a quantum decoder algorithm, such as a minimum-weight perfect-matching ("MWPM") decoder, by determining edge weights to be assigned to one or more decoding graphs that can characterize one or more error-sensitive events of a quantum circuit. Various embodiments described herein can include a correlation inversion decoder that can estimate edge probabilities of a decoding graph that are consistent with a syndrome dataset to capture quantum experiment details, such as asymmetries in qubit error rates. Also, one or more embodiments described herein can include a tuned analytic decoder that can trace Pauli faults through a quantum circuit to determine edge probabilities for a decoding graph as a function of error rates of circuit components. Given a syndrome dataset the tuned analytic decoder can determine the edge probabilities that optimize decoding the dataset in terms of one or more noise parameters.

The computer processing systems, computer-implemented methods, apparatus and/or computer program products employ hardware and/or software to solve problems that are highly technical in nature (e.g., quantum decoding), that are not abstract and cannot be performed as a set of mental acts by a human. For example, an individual, or a plurality of individuals, cannot tune one or more decoding graphs to identify and/or correct Pauli error faults.

Also, one or more embodiments described herein can constitute a technical improvement over conventional Pauli error models by enhancing the sensitivity and/or accuracy of one or more decoding graphs employed by a quantum decoder algorithm. For example, various embodiments described herein can employ a correlation inversion quantum decoder to approximate higher-order (e.g., second-order) corrections to edge probabilities of one or more decoding graphs. Further, one or more embodiments described herein can have a practical application by optimizing the decoding of topological quantum codes. Also, one or more embodiments described herein can have a practical application by diagnosing one or more unexpected correlations in a quantum circuit that may inhibit error correction. One or more embodiments described herein can control parameterization of one or more decoding graphs to capture experiment noise that can be overlooked by typical Pauli error models employed for quantum error correction.

Further, various embodiments described herein can determine probabilities of second order errors of a quantum circuit. Thus, one or more embodiments described herein can enable the preparation and/or stabilization of a logical quantum state with low error rates; thereby facilitating execution of quantum algorithms on larger, fault-tolerant quantum circuits. As a result, one or more embodiments described herein can result in more accurate output for a given analysis and/or better performance through active error suppression when operating the quantum computer. Moreover, various embodiments described herein can extract quantitative noise from experiment data to diagnose and reduce logical errors per cycle of code at large distances. Additionally, one or more embodiments described herein can enable the training of quantum decoding algorithms in, or near, real-time, whereby logical operations can be interleaved with calibration circuits to periodically update the decoder graph's prior information with calibrated correlation probabilities.

Various embodiments described herein can regard one or more quantum circuits having superconducting qubit connectivity characterized by a geometric lattice, which can improve fidelity of quantum operations by mitigating cross-talk. Fault-tolerant operations can employ intermediary, flag qubits, to mediate interactions between data qubits and syndrome qubits. For example, flag qubits can be employed to identify error events associated with high-weight errors originating from low-weight errors to facilitate one or more error decoding algorithms. For instance, flag qubits can extend the effective distance of a QEC algorithm and enable optimized efficiency at detecting and/or correcting errors.

Additionally, the efficacy of various embodiments described herein can be demonstrated in multiple examples via a repeated error detection and correction of a [[4,1,2]] QEC code (e.g., an error-detecting topological stabilizer code) on a device designed to mitigate the limiting effects of cross-talk using flag qubits. Further, the various examples described herein can be demonstrated on a hexagonal lattice with a code distance of value 2. However, the various embodiments described herein can be immediately extended to operate larger distance versions of the fault-tolerant protocols executed on the heavy-hexagon lattice used herein. Additionally, although the distance-2 version is implemented on a subset of the qubits within a larger heavy-hexagon quantum circuit, other topologies can benefit from the quantum decoder calibration described herein. For example, a heavy-square topology akin to the rotated surface code with added flag qubits. Additionally, the probabilistic error correction methods and higher order error correlation analysis described herein can improve quantum decoders with regards to quantum circuit topologies with or without flag qubits.

FIG. 1 illustrates a block diagram of an example, non-limiting system 100 that can calibrate one or more quantum decoder algorithms. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, one or more input devices 106, and/or one or more quantum computers 108. The server 102 can comprise communications component 110, correlation inversion decoder component 112, and/or tuned analytic decoder component 114. Also, the server 102 can comprise or otherwise be associated with at least one memory 116. The server 102 can further comprise a system bus 118 that can couple to various components such as, but not limited to, the correlation inversion decoder component 112, the tuned analytic decoder component 114, the communications component 110, associated components thereof, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the correlation inversion decoder component 112 and/or tuned analytic decoder component 114 can be provided on the one or more servers 102, it should be appreciated that the architecture of system 100 is not so limited. For example, the correlation inversion decoder component 112, the tuned analytic decoder component 114, or one or more components thereof, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more decoding graphs and/or measurement data (e.g., from a syndrome execution circuit of one or more quantum computers 108) into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, the one or more quantum computers 108 can comprise quantum hardware devices that can utilize the laws of quantum mechanics (e.g., such as superposition and/or quantum entanglement) to facilitate computational processing (e.g., while satisfying the DiVincenzo criteria). In one or more embodiments, the one or more quantum computers 108 can comprise a quantum data plane, a control processor plane, a control and measurement plane, and/or a qubit technology.

In one or more embodiments, the quantum data plane can include one or more quantum circuits comprising physical qubits, structures to secure the positioning of the qubits, and/or support circuitry. The support circuitry can, for example, facilitate measurement of the qubits' state and/or perform gate operations on the qubits (e.g., for a gate-based system). In some embodiments, the support circuitry can comprise a wiring network that can enable multiple qubits to interact with each other. Further, the wiring network can facilitate the transmission of control signals via a direct electrical connection and/or electromagnetic radiation (e.g., optical, microwave, and/or low-frequency signals). For instance, the support circuitry can comprise one or more superconducting resonators operatively coupled to the one or more qubits. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

In one or more embodiments, the control processor plane can identify and/or trigger a Hamiltonian sequence of quantum gate operations and/or measurements, wherein the sequence executes a program (e.g., provided by a host processor, such as server 102, via correlation inversion decoder component 112 and/or tuned analytic decoder component 114) for implementing a quantum algorithm. For example, the control processor plane can convert compiled code to commands for the control and measurement plane. In one or more embodiments, the control processor plane can further execute one or more quantum error correction algorithms.

In one or more embodiments, the control and measurement plane can convert digital signals generated by the control processor plane, which can delineate quantum operations to be performed, into analog control signals to perform the operations on the one or more qubits in the quantum data plane. Also, the control and measurement plane can convert one or more analog measurement outputs of the qubits in the data plane to classical binary data that can be shared with other components of the system 100.

One of ordinary skill in the art will recognize that a variety of qubit technologies can provide the basis for the one or more qubits of the one or more quantum computers 108. For instance, superconducting qubits can be employed by the one or more quantum computers, in which the superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls.

In one or more embodiments, the communications component 110 can facilitate the sharing of data between the correlation inversion decoder component 112, the tuned analytic decoder component 114, and/or the one or more quantum computers 108, and/or vice versa (e.g., via a direct electrical connection and/or through the one or more networks 104).

The system 100 can employ one or more QEC codes 122 (e.g., a topological stabilizer code) to identify, using syndrome measurements, error-sensitive events that occur in one or more quantum circuits of the one or more quantum computers 108 so that the proper corrections can be applied. For example, the one or more QEC codes 122 can protect quantum information from errors due to quantum noise in order to prepare and/or preserve logical quantum states. Further, a quantum decoding for the one or more QEC codes 122 can operate on one or more decoding graphs and/or decoding hypergraphs. For instance, the one or more QEC codes 122 can analyze syndrome measurement datasets from the one or more quantum computers 108, where error-sensitive events can be linear combinations of syndrome measurement bits that would equate to zero in an ideal quantum circuit operation of the one or more quantum computers 108. A non-zero error-sensitive event can be indicative of an error in the quantum circuit of the one or more quantum computers 108. For instance, the error can be a Pauli error occurring: after a gate of the quantum circuit, after an idle of the quantum circuit, after initialization of the quantum circuit, or before a measurement. The Pauli error can be an n-qubit Pauli error if the faulty quantum circuit component acts on "n" qubits (e.g., a 2-qubit Pauli error can occur after 2-qubit gates). Thus, the error-sensitive events can depend on the topology of the quantum circuit of the quantum computers 108, as characterized by a geometric lattice. For example, with regards to a heavy hexagon lattice, there can be at least two types of error-sensitive events: (1) the difference of two subsequent measurements of the same stabilizer, and (2) flag qubit measurements.

Error-sensitive events can be depicted as nodes in a decoding graph with edges representing errors that can be detected by both events at their end points. Where the probability of an edge occurring is P, the edge can be given a weight value equal to log((1−P)/P). Additionally, decoding graphs can comprise a boundary node, where an error detected by a single error-sensitive event can be represented as an edge from that event to the boundary node. Also, errors detected by more than two error-sensitive events can be represented as hyperedges in a decoding hypergraph.

Various quantum decoder algorithms, such as minimum-weight perfect-matching ("MWPM"), union-find, and/or maximum-likelihood, can be employed with regards to QEC codes 122 (e.g., topological stabilizer codes) and can operate on the one or more decoding graphs. For example, with regards to MWPM, given a set of non-zero error-sensitive events, the MWPM can find a set of edges of a decoding graph consistent with those events with minimum total weight. While MWPM is computationally efficient, the analogous matching algorithm on a hypergraph is not, which limits the practicality of the decoding hypergraph.

The effectiveness of quantum decoder algorithms can depend on the edge weights employed in the decoding graph, and/or the hyperedge weights employed in the decoding hypergraph. In various embodiments the tuned analytic decoder component 114 can tune one or more decoding graphs by individually calculating edge weights in terms of Pauli error rate parameters $p_j$, where the index i can indicate errors being considered. Example types of errors that can be considered by the tuned analytic decoder component 114 can include, but are not limited to, depolarizing noise or more general Pauli noise occurring on: CNOT gates, single-qubit gates, idle locations, initialization, resets, measurements, CPHASE gates, sqrt(iSWAP) gates, a combination thereof, and/or the like. Additionally, in various embodiments, the correlation inversion decoder component 112 can analyze experiment data to determine a set of edge probabilities that are likely to have produced the data by calculating, for example, the probabilities for all hyperedges in a decoding hypergraph before determining the edge probabilities used in the decoder graph.

Each hyperedge h in the decoding hypergraph can represent any of a number of Pauli faults in the quantum circuit, and can be indistinguishable from one another at least because the Pauli faults can lead to the same set of h of non-zero error-sensitive events. If several Pauli faults occur together, the symmetric difference of the hyperedges can be denoted S, the syndrome (e.g., the set of non-zero error-sensitive events observed). The probability of observing a particular S can be the probability that hyperedges occur in combination to produce S. Since this probability can be related to the probability $\alpha_h$ of individual hyperedges h occurring, $\alpha_h$ can be learned from multiple observations of S.

To extract the hyperedge probabilities from each run of an experiment executed on a quantum circuit, the correlation inversion decoder component 112 and/or the tuned analytic decoder component 114 can analyze the measured vectors $\vec{X}$, which can indicate error-sensitive events. For example, $\vec{X}$ can be the result of several Pauli errors occurring with independent probabilities. If a fault f (e.g., a Pauli error) alone can result in a hyperedge $\vec{X}_f$, then $\vec{X} = \Sigma \vec{X}_f$ where the addition operates modulo 2. Several faults can result in the same hyperedge $\vec{X}_f$, where the respective probabilities add to probability $\alpha_f$ of the hyperedge. In accordance with various embodiments described later herein, the correlation inversion decoder component 112 can estimate all the $\alpha_f$ from multiple samples of $\vec{X}$. The possible hyperedges can be limited in size (i.e. the Hamming weight $|\vec{X}_f|$) by locality of the quantum circuits. For example, in the [[4,1,2]] error-detecting topological stabilizer code, the hyperedges can be limited to sizes four or less. In one or more embodiments, the correlation inversion decoder component 112 can determine $\alpha_f$ by considering local clusters and then adjusting local estimates recursively from larger hyperedges to smaller hyperedges (e.g., size-4 hyperedges down to size-1 and -2).

Figure 2:
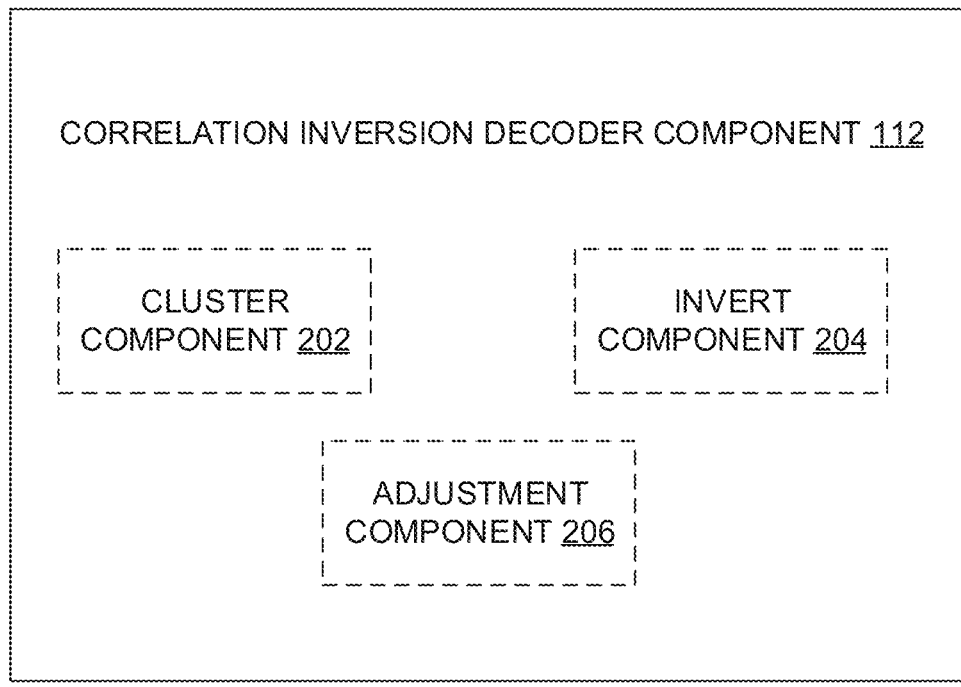
FIG. 2 illustrates a block diagram of an example, non-limiting, correlation inversion decoder component that can analyze experiment data to determine a set of edge probabilities likely to have produced the data in accordance with one or more embodiments described herein.

FIG. 2 illustrates a diagram of the example, non-limiting correlation inversion decoder component 112 further comprising cluster component 202, invert component 204, and/or adjustment component 206 in accordance with one or more embodiments described herein. Repetitive description of like elements employed in other embodiments described herein is omitted for the sake of brevity. In various embodiments, the correlation inversion decoder component 112 can determine edge probabilities of one or more decoding graphs, where error-sensitive events can be represented by nodes N of the one or more decoding graphs. Pauli error faults can cause subsets of error-sensitive events to trigger together, where correlated triggers can be represented by the edges (e.g., subsets of nodes) in the one or more decoding graphs. For instance, the correlation inversion decoder component 112 can calculate probabilities for hyperedges in a decoding hypergraph to subsequently determine the edge probabilities used in the decoding graph.

In one or more embodiments, the correlation inversion decoder component 112 can determine the hyperedge probabilities with a syndrome dataset (e.g., a set of measurement data regarding the given quantum circuit). For instance, the correlation inversion decoder component 112 can utilize syndrome outcomes from each stabilizer round of a QEC code 122 to perform a post-facto logical correction in software. For example, the correlation inversion decoder component 112 can populate the decoding graph with edge weights informed by calibrations derived from measurement datasets (e.g., observed experiment data). The correlation inversion decoder component 112 can assume that hyperedges can occur independently, where a set of error-sensitive events can be denoted by E and a set of possible hyperedges can be denoted by H. Hyperedges H can be determined from, for instance, Pauli tracing of single faults with additional hyperedges added if they are suspected to be of experimental relevance.

For example, a Pauli depolarizing noise model can be employed by the correlation inversion decoder component 112 to perform the Pauli tracing. For instance, a qubit initialization, gate, idle location, or measurement can suffer a fault, in which the fault can be followed or preceded by a Pauli P acting on the same number of qubits as the quantum circuit component. Initializations and measurements can suffer X errors, while 1- and 2-qubit cases can suffer an error from the 1- or 2-qubit Pauli groups. For instance, consider a set of Pauli errors that can result from single faults in a syndrome measurement circuit. For each Pauli error in the set, the model can propagate the fault through the quantum circuit and determine the set of error-sensitive events that can detect the error. Thereby, the set can become a hyperedge in the decoding hypergraph. At first order, the probability P of the hyperedge can be sum of probabilities of the faults that can cause the hyperedge, and the hyperedge's weight value can be equal to $\log((1-P)/P)$.

From measurement data, estimates of the expectation values $\langle h \rangle := \langle \Pi_{i \in h} X_i \rangle$ can be accessed, where $X_i$ is the random variable associated to error-sensitive event $i \in E$ and $h \in H$ is a hyperedge. Also, these expectation values can be written in terms of hyperedge probabilities $\alpha_h$. Suppose $L_h \subseteq H$ is the set of hyperedges that have non-empty intersection with h. Then $\langle h \rangle$ can be calculated in accordance with Equation 1 below.

$$\langle h \rangle = \sum_{\substack{A \subseteq L_h \text{ with} \\ h \subseteq \Delta_{a \in A} a}} \left( \prod_{a \in A} \alpha_a \prod_{b \in L_h - A} (1 - \alpha_b) \right) \quad (1)$$

Where $\Delta$ can denote the symmetric difference of sets. Analyzing this equation for all $h \subseteq H$ can form a system of $|H|$ equations and $|H|$ unknowns that can be solved for $\alpha_h$ in terms of the experimentally estimated expectations $\langle h \rangle$. However, the system of equations can be computationally expensive to solve.

To reduce the computational resource requirements, the correlation inversion decoder component 112 can approximate solutions to the equations. In one or more embodiments, the cluster component 202 can sort one or more hyperedges represented in the one or more decoding graphs (e.g., decoding hypergraphs) into one or more clusters. For example, the cluster component 202 can find a subset $C \subset 2^E$ (e.g., where $2^E$ can be the powerset of E) such that for $h \in H$, there is a $c \in C$ such that $h \subseteq c$. Where "c" is a cluster, and "C" is the set of all clusters. An example scheme for sorting the hyperedges can include, but is not limited to, sorting by size. In one or more embodiments, the cluster component 202 can sort the hyperedges by size from largest to smallest. For instance, the cluster component 202 can analyze a sorted list of the hyperedges (e.g., identified by tracing Pauli faults) and place a hyperedge into C if the hyperedge is not already a subset of an element of C (e.g., if the hyperedge is not already a subset of another sorted hyperedge). The sorting by the clustering component 202 can generate a plurality of clusters, where the largest cluster size can be equal to the largest hyperedge size.

Further, the invert component 204, can determine the weight value for each cluster $c \in C$ of hyperedges. For example, $S_c \subseteq H$ can be the set of hyperedges that are a subset of a cluster c. For each $h \in S_c$, the invert component 204 can calculate $\langle h \rangle$ as if $S_c$ are the only existing hyperedges in accordance with Equation 2 below.

$$\langle h \rangle_c = \sum_{\substack{A \subseteq S_c \text{ with} \\ h \subseteq \Delta_{a \in A} a}} \left( \prod_{a \in A} \alpha_a \prod_{b \in S_c - A} (1 - \alpha_b) \right) \quad (2)$$

Thereby, the invert component 204 can establish a system of $|S_c|$ equations and unknowns, and the $\alpha_h$ for $h \in S_c$. At least because the clusters are at most the size of the largest hyperedges, the invert component 204 can employ reduced computational resources to determine the weight values associated with each hyperedge. For example, with regards to an example [[4,1,2]] error-detecting topological stabilizer code, a size-2 cluster can be solved by the invert component 204 analytically; while clusters with sizes three and/or four can be solved numerically. For instance, a cluster with size $|c|$ can lead to less than or equal to $2^{|c|}-1$ equations.

In one or more embodiments, the adjustment component 206 can further adjust the one or more weight values determined by the invert component 204 to account for hyperedges that span across multiple clusters. For example, $h \subseteq c$ can be a first hyperedge within cluster c with a probability $\alpha_h$. Further, a second hyperedge h' can exist, where h'$\not\subseteq$c but h'∩c=h. For instance, the first and second hyperedges can represent separate error-sensitive events, but can overlap each other in the one or more decoding hypergraphs. In other words, the first hyperedge can be sorted into a first cluster, and the second hyperedge can be sorted into a second cluster, while the second hyperedge can contain the first hyperedge. When the invert component 204 solves for weight value for the cluster c, the invert component 204 can obtain the probability $\hat{\alpha}_h$ for the first hyperedge h, where $\hat{\alpha}_h$ can be the sum of two separate error-sensitive events: the error-sensitive event represented by the first hyperedge h occurred without the error sensitive event represented by the second hyperedge h' occurring; or the error-sensitive event represented by the first hyperedge h' occurred without the error sensitive event represented by the second hyperedge h occurring. The adjustment component 206 can determine an adjusted probability of the first hyperedge by subtracting the probability of the second hyperedge from the first hyperedge. For example, the probability the first hyperedge h adjusted by the second hyperedge h' can be computed by the adjustment component 206 in accordance with Equation 3 below.

$$\alpha_h = (\hat{\alpha}_h - \alpha_{h'})/(1 - 2\alpha_{h'}) \quad (3)$$

Further, the adjustment component 206 can adjust a hyperedge by several other hyperedges via sequential adjustments for each respective hyperedge. For example, a hyperedge can overlap multiple other hyperedges in the one or more decoding hypergraphs, where the adjustment component 206 can account for multiple overlaps in analyzing the respective error-sensitive events represented by the plurality of hyperedges.

In one or more embodiments, the largest hyperedges do not require adjustment by the adjustment component due to the lack of another h' hyperedge to adjust by and can therefore provide a base for the recursive adjustment of smaller hyperedges. For example, the adjustment component 206 can adjust each hyperedge $h \in H_c$ of size s-1 by determining all hyperedges h' with a weight value of at least s, such that h'∩c=h and h'$\not\subseteq$ c. For all such hyperedges h', the adjustment component 206 can perform an adjustment in accordance with $\alpha_h \leftarrow (\alpha_h - \alpha_{h'})/(1 - 2\alpha_{h'})$. Thereby, the adjustment component 206 can determine one or more adjusted probabilities $\alpha_h$. At least because a given hyperedge can be comprised within two different clusters, the adjustment component 206 can determine multiple adjusted probabilities $\alpha_h$ for a given hyperedge. In one or more embodiments, the adjustment component 206 can average the multiple adjusted probabilities of a given hyperedge to determine a final probability value (e.g., characterized by a weight value in the one or more decoding hypergraphs).

FIGS. 3A-C illustrate diagrams characterizing an example, non-limiting quantum circuit topology that can be analyzed by the system 100 to reduce the error rate of quantum calculations (e.g., via correlation inversion decoder component 112 and/or the tuned analytic decoder component 114) in accordance with one or more embodiments described herein. Repetitive description of like elements employed in other embodiments described herein is omitted for the sake of brevity.

FIG. 3A illustrates an exemplary heavy hexagon lattice 300 that can characterize a quantum circuit topology. In the exemplary heavy hexagon lattice 300, qubits 302, and their respective connectivity, can be depicted by a plurality of circles arranged on a geometric lattice having a hexagonal shape. Further, FIG. 3A depicts an enlarged section of the exemplary heavy hexagon lattice 300 that can represent 7 qubits 302 used to execute a [[4,1,2]] error-detecting topological stabilizer code to demonstrate the efficacy of various embodiments described herein.

FIG. 3B illustrates an exemplary code layout 304 comprising the 7 qubits 302 used to execute the [[4,1,2]] code. In the enlarged portion of the exemplary heavy hexagon lattice 300 and the exemplary code layout 304: white circles can denote data qubits 302a (e.g., data qubit $d_0$, $d_1$, $d_2$, and/or $d_3$); dot-shaded circles can denote flag qubits 302b; and the cross-shaded circle can denote a syndrome qubit 302c. As shown in FIG. 3B, the exemplary code layout 304 can comprise a single weight-4, X stabilizer 306 and two weight-2, Z stabilizers 308. For the weight-2 stabilizers, scripts "0,2" and "1,3" can indicate the left and right halves of the exemplary code layout 304. The reduced connectivity of the graph can be addressed by the flag qubits 302b (e.g., dot-shaded circles) alternating between: being used as weight-2 stabilizers; and being used an intermediary qubits to detect errors on the syndrome qubit 302c (e.g., cross-shaded circle).

FIG. 3C illustrates an exemplary decoder graph 309 that can be tuned by the correlation inversion decoder component 112 and/or the tuned analytic decoder component 114. The exemplary decoder graph 309 regards the exemplary code layout 304. For example, syndromes from the weight-4 stabilizer can be mapped to nodes 310 of the exemplary decoder graph 309. Further, syndromes from weight-2 stabilizers can be mapped to nodes 312 of the exemplary decoder graph 309. Also, weight-2 flag measurements can be mapped onto nodes 314 of the exemplary decoder graph 309. Scripts "0,1" and "0,2" can denote the left and right sides of the exemplary code layout 304. For initial $|-/+\rangle_L$ states stabilized by the quantum circuit, there can be three different possible size-4 hyperedges within each cycle, with each highlighted in grey across three consecutive cycles.

Figure 4A:
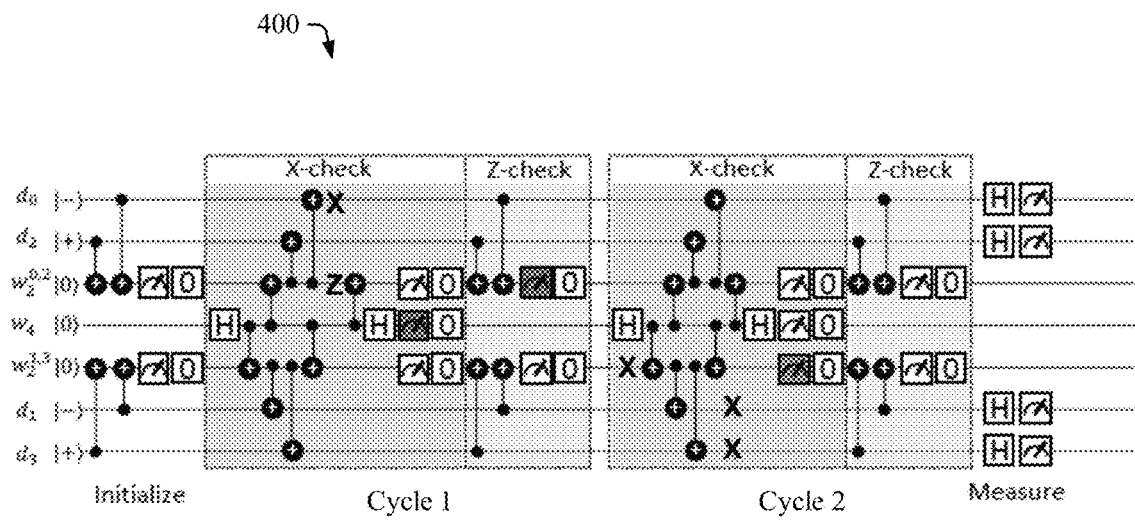
FIGS. 4A-4C illustrate diagrams of an example, non-limiting, Pauli fault tracing procedure that can be represented on one or more decoding graphs in accordance with one or more embodiments described herein.
Figures 4B, 4C:
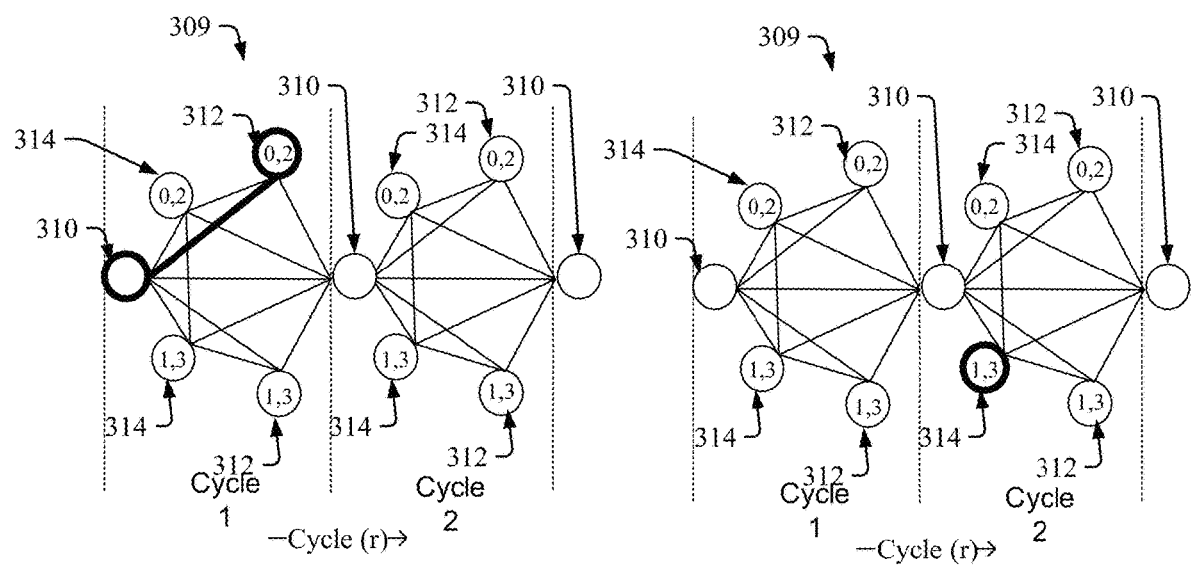

FIGS. 4A-4C illustrate diagrams of how one or more Pauli faults can be used by a quantum decoder algorithm calibrated and/or tuned by the correlation inversion decoder component 112 and/or the tuned analytic decoder component 114 in accordance with one or more embodiments described herein. Repetitive description of like elements employed in other embodiments described herein is omitted for the sake of brevity. For example, FIG. 4A can depict the occurrence of one or more Pauli faults in an exemplary quantum circuit 400. The exemplary quantum circuit 400 can be employed for the exemplary code layout 304 applied to an initial $|-\rangle_L$ logical state with alternating, repeated cycles of X- and Z-check stabilizer measurements with mid-circuit reset operations applied between cycles.

FIG. 4B can depict a decoding graph with a highlighted edge (e.g., represented by a bold black line) that can correlate to the Pauli faults in cycle 1 depicted in FIG. 4A. FIG. 4C can depict a decoding graph with a highlighted node (e.g., a node represented by a bold circle) that can correlate to the Pauli fault in cycle 2 depicted in FIG. 4A. For instance, when a weight-2, ZX Pauli error occurs after a CNOT gate during an X-stabilizer measurement, two events can be triggered, where a quantum decoder algorithm calibrated and/or tuned by the correlation inversion decoder component 112 and/or the tuned analytic decoder component 114 can identify the edge connecting the events (e.g., the highlighted edge in FIG. 4B). When a weight-1, X Pauli error occurs on a flag qubit 302, a weight-2 Pauli error can appear on the modes 314 correlating to the data qubits.

Figure 5:
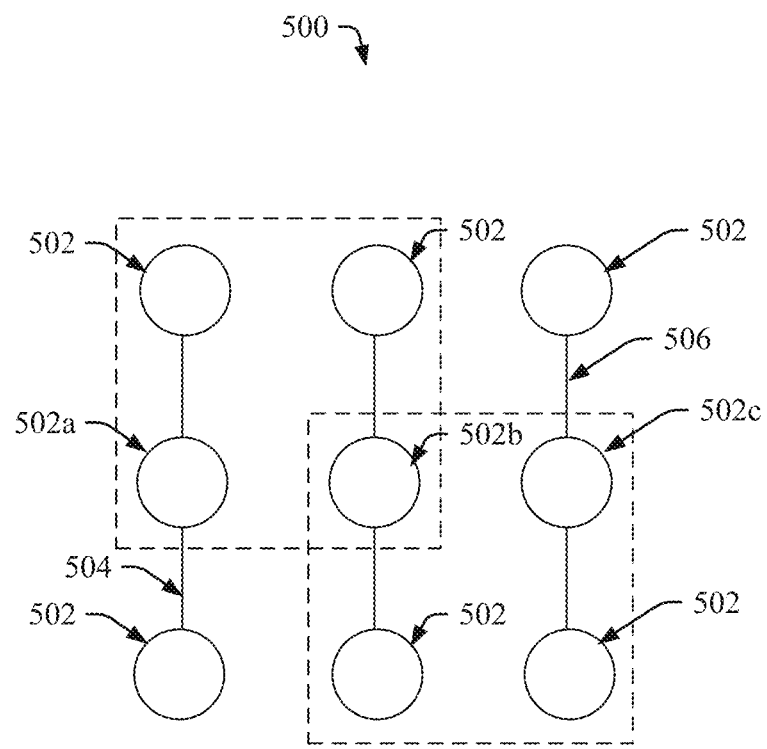
FIG. 5 illustrates a diagram of an example, non-limiting, decoding hypergraph with one or more clustered hyperedges in accordance with one or more embodiments described herein.

FIG. 5 illustrates a diagram of an example, non-limiting decoding hypergraph 500 that can comprise one or more hyperedges that can be sorted by the correlation inversion decoder component 112 (e.g., via cluster component 202) in accordance with one or more embodiments described herein. Repetitive description of like elements employed in other embodiments described herein is omitted for the sake of brevity. For example, each decoding hypergraph node 502 can correspond to an error-sensitive event. The exemplary decoding hypergraph 500 can comprise two size-4 hyperedges (e.g., represented by dashed lines in FIG. 5), six size-2 hyperedges (e.g., represented by solid lines in FIG. 5), and nine size-1 hyperedges (e.g., represented by each hypergraph node 502 in FIG. 5). In accordance with various embodiments described herein, a valid set of clusters C can consist of both size-4 hyperedges (e.g., h and h') and the two size-2 hyperedges 504, 506. After solving $\hat{\alpha}_h$ on each cluster (e.g., via invert component 204), the probabilities for hyperedges 502a, 502b, and/or 502c can be adjusted (e.g., via adjustment component 206) to determine the adjusted probability value of $\alpha_h$.

Figure 6:
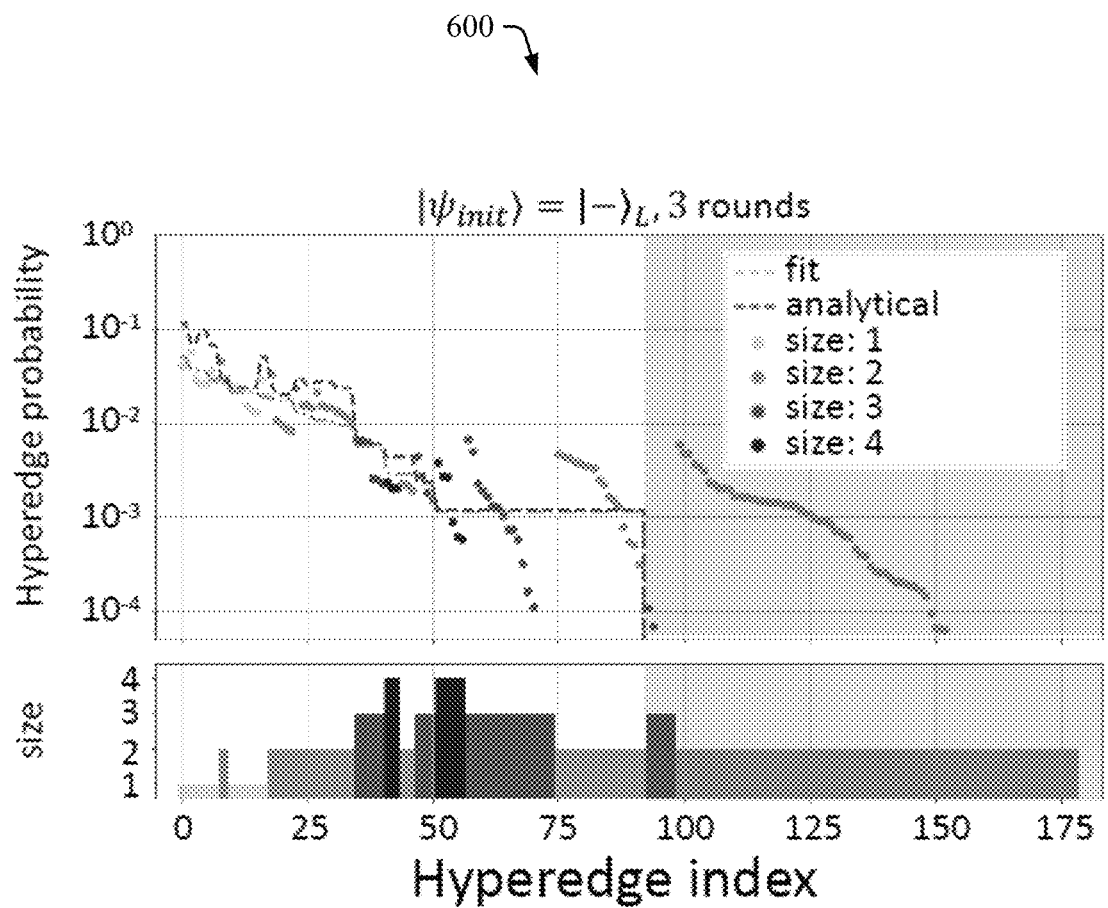
FIG. 6 illustrates a diagram of an example, non-limiting, graph that can demonstrate a sorting of decoder hypergraph hyperedges based on size in accordance with one or more embodiments described herein.

FIG. 6 illustrates a diagram of example, non-limiting graph 600, which can depict adjusted correlation probabilities of hyperedges characterized by the exemplary decoder graph 309 and/or the code layout 304 with three cycles of stabilizer measurements in accordance with one or more embodiments described herein. Repetitive description of like elements employed in other embodiments described herein is omitted for the sake of brevity. The hyperedge probabilities depicted in graph 600 were calculated by correlation inversion decoder component 112. As shown in graph 600, the correlation inversion decoder component 112 can sort the hyperedges from largest to smallest based on the results from a least squares fit using a six parameter noise model. Points with darker shading can represent hyperedges of greater size. Hyperedges with indices greater than 93 had no analytical expression, but were experimentally adjusted to quantify the impact of computational leakage. As shown in graph 600, the result of fitting the six term noise model agree with the analytical curve, which was generated using noise terms from simultaneous randomized benchmarking.

Figure 7:
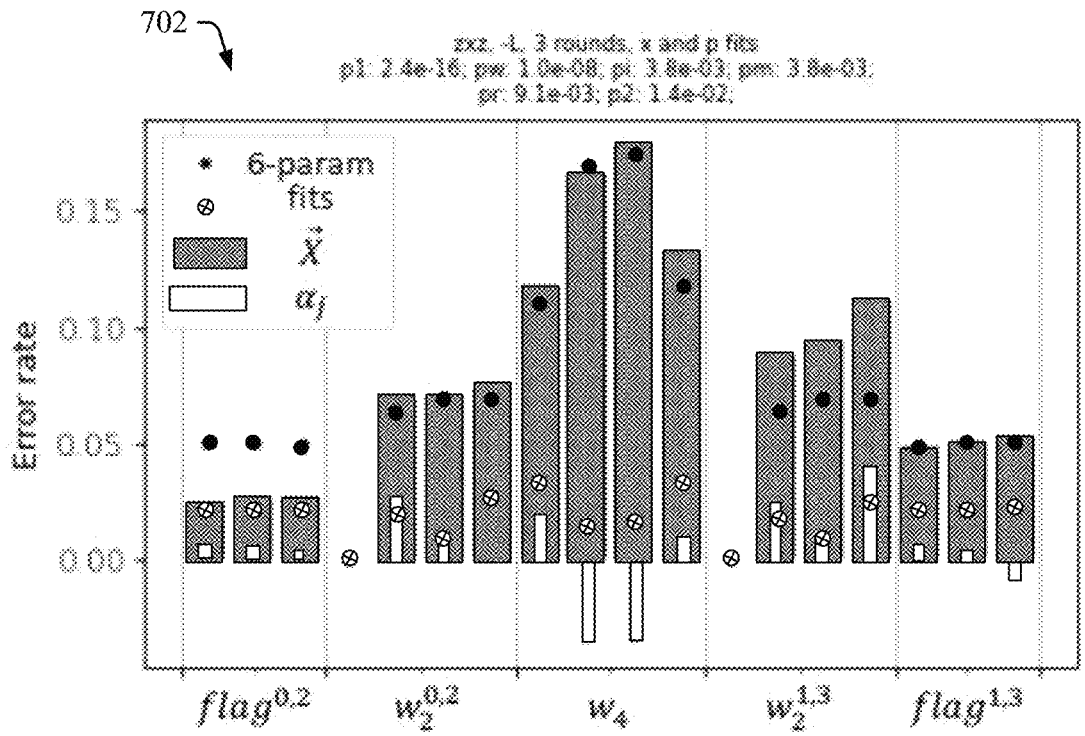
FIG. 7 illustrates diagrams of example, non-limiting, graphs that can demonstrate the efficacy of a correlation inversion decoder component at determining hyperedge probabilities in accordance with one or more embodiments described herein.
Figure 7:
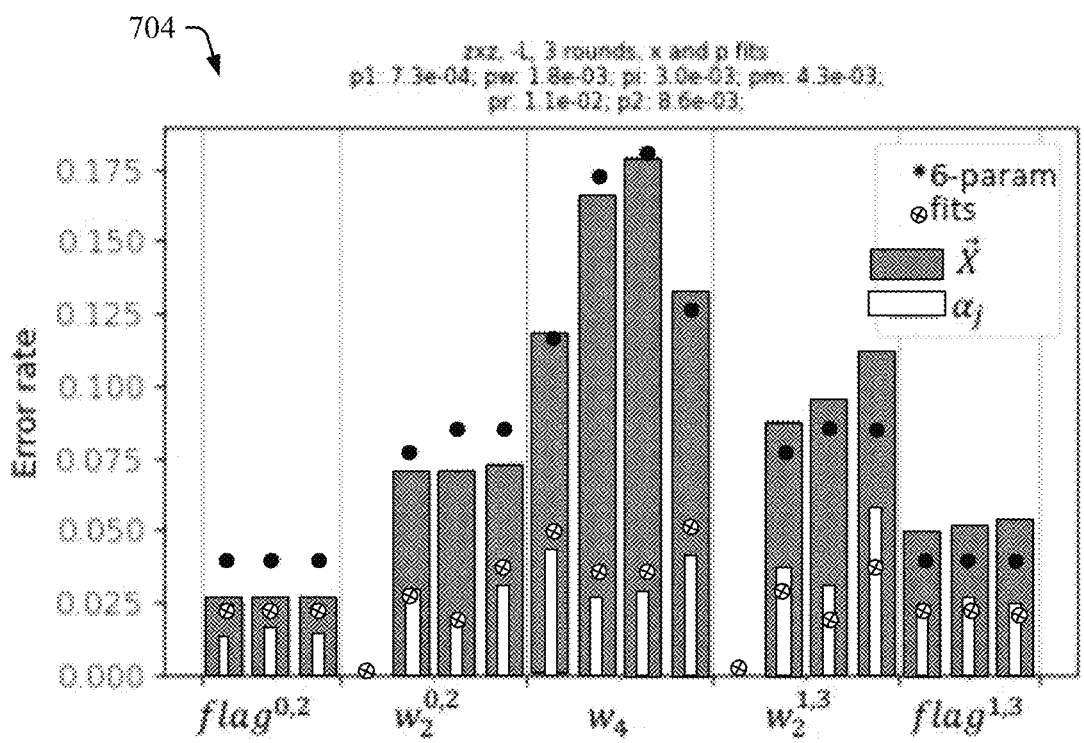
Figure 8:
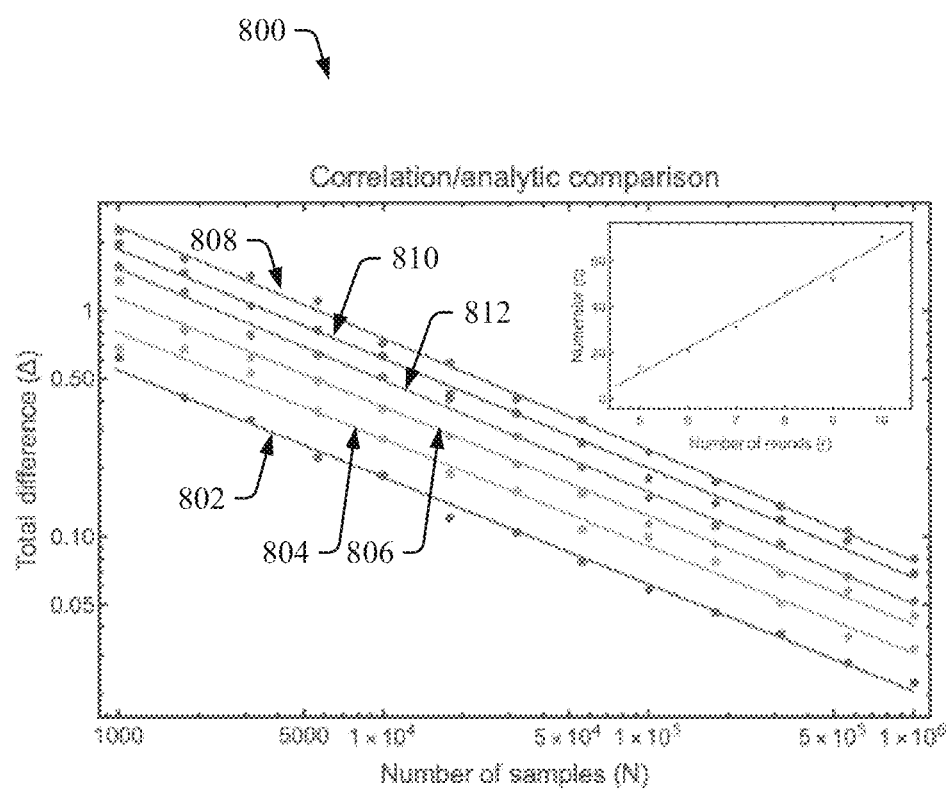
FIG. 8 illustrates diagrams of example, non-limiting, graphs that can demonstrate the efficacy of a correlation inversion decoder component at determining hyperedge probabilities in accordance with one or more embodiments described herein.

FIGS. 7-8 illustrate diagram of example, non-limiting graphs 702, 704, and/or 800 that can further demonstrate the efficacy of the correlation inversion decoder component 112 in accordance with one or more embodiments described herein. Repetitive description of like elements employed in other embodiments described herein is omitted for the sake of brevity.

Graph 702 depicts results achieved via an uncalibrated MWPM decoder algorithm. As shown in graph 702, only size-1 and -2 hyperedges are required for a typical MWPM algorithm; however, ignoring larger hyperedges can result in non-physical, negative size-1 correlations. Graph 704 depicts results that can be achieved via the correlation inversion decoder component 112. As shown in graph 704 the correlation inversion decoder component 112 can employ an adjustment procedure applied up to, for example, size-4 hyperedges; where size-1 values can be non-negative and physical, thereby usable in feeding the decoder graph edges.

Graph 800 compares the correlation inversion decoder component 112 with an analytic decoder in simulations of r cycles of the [[4,1,2]] code by plotting $\Delta = \Sigma_{h \in H} |p_h^{correlation} - p_h^{analytic}|$, where $p_h^{analytic}$ represents hyperedge probabilities calculated at first-order in fault probabilities. N can denote the number of samples, and the best fits can indicate the behavior $\Delta(N,r) = c(r)/\sqrt{N}$; where c can be a linear function. Line 802 represents 5 cycles; line 804 represents 6 cycles; line 806 represents 7 cycles; line 808 represents 8 cycles; line 810 represents 8 cycles; line 812 represents 9 cycles; and/or line 814 represents 10 cycles. Graph 800 demonstrates that with reduced computational requirements the correlation analysis performed by the correlation inversion decoder component 112 can provide an accurate assessment of the hyperedge probabilities. For example, the error in the correlation analysis can scale with the number of runs of the experiment, N, as $1/\sqrt{N}$.

Additionally, various embodiments of the correlation inversion decoder component 112 can provide an advantage for larger quantum codes. For example, 3 cycles of syndrome measurement were performed on a heavy hexagon code with a distance value of 3 (e.g., resulting in size-5 hyperedges) and CNOT error rates sampled from a Gaussian distribution. Table 1, presented below, comprises logical error rates calculated from a 3 million shot dataset. Error bars were calculated via one or more bootstrapping algorithms. Further, the quantum circuit components can have a $10^{-3}$ error rate, the CNOT error rates can have a mean value of $10^{-3}$, and the standard deviation ("SD") can be varied. "Uniform" can represent the results of a decoding scheme in which hyperedges are assigned a uniformed probability. "Analytic" can represent the results of a decoding scheme employing an uncalibrated, traditional quantum decoder algorithm. "Correlation" can represent the results of a decoding scheme performed by the correlation inversion decoder component 112 in accordance with the various embodiments described herein.

TABLE 1

|  | SD = 0 | SD = 3E-4 | SD = 6E-4 |
|---|---|---|---|
| Uniform | 1.629(8) × 10⁻² | 1.609(5) × 10⁻² | 1.635(6) × 10⁻² |
| Analytic | 6.89(5) × 10⁻³ | 6.82(5) × 10⁻³ | 6.83(3) × 10⁻³ |
| Correlation | 6.61(5) × 10⁻³ | 6.61(5) × 10⁻³ | 6.53(2) × 10⁻³ |

Table 2, presented below, comprises logical error rates calculated from a 3 million shot dataset. Error bars were calculated via one or more bootstrapping algorithms. Further, the quantum circuit components can have a $10^{-3}$ error rate, the CNOT error rates can have a mean value of $10^{-4}$, and the standard deviation ("SD") can be varied.

TABLE 2

|  | SD = 0 | SD = 3E-5 | SD = 6E-5 |
|---|---|---|---|
| Uniform | 9.0(1) × 10⁻⁴ | 9.1(2) × 10⁻⁴ | 9.1(1) × 10⁻⁴ |
| Analytic | 8.0(5) × 10⁻⁵ | 8.0(6) × 10⁻⁵ | 7.2(5) × 10⁻⁵ |
| Correlation | 8.0(5) × 10⁻⁵ | 8.0(6) × 10⁻⁵ | 7.1(4) × 10⁻⁵ |

As shown in Table 2, turning the error rates down to $10^{-4}$ can diminish the amount by which the correlation inversion decoder component 112 outperforms the other decoding schemes. At least because the uncalibrated, traditional analytic decoder makes only first order approximations to the edge probabilities, and second order corrections can be less relevant at small error rates; the correlation inversion decoder component 112 can outperform traditional decoders at larger error rates by approximating higher order corrections to the probabilities.

Figure 9:
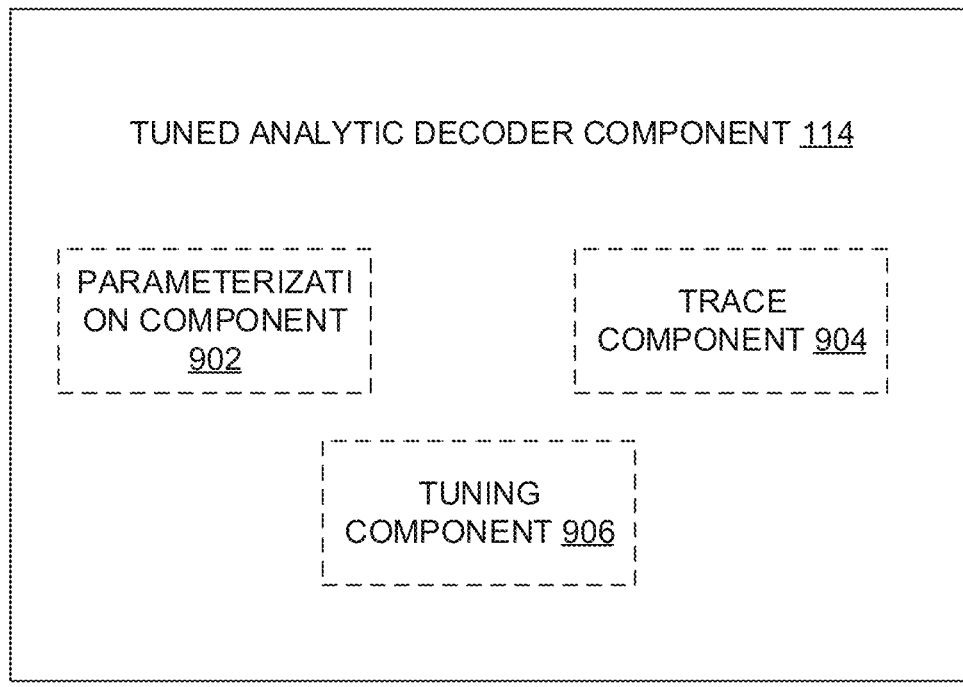
FIG. 9 illustrates a block diagram of an example, non-limiting, tune analytic decoder component that can calculate one or more edge weights of a decoder graph in terms of Pauli error rate parameters in accordance with one or more embodiments described herein.

FIG. 9 illustrates a diagram of the example, non-limiting tuned analytic decoder component 114 comprising parameterization component 902, trace component 904, and tuning component 906 in accordance with one or more embodiments described herein. Repetitive description of like elements employed in other embodiments described herein is omitted for the sake of brevity.

In various embodiments, the parameterization component 902 can parameterize Pauli noise in the syndrome extraction circuit. For example, based on a model of Pauli noise, the parametrization component 902 can parameterize edge weights of the decoding graph in terms of physical noise parameters. As described herein, the parameterization component 902 can employ a depolarizing noise model with regards to one or more noise parameters. Example noise parameters can include, but are not limited to, depolarizing noise or more general Pauli noise occurring on: single-qubit gates, two-qubit gates, idle locations, qubit initializations, resets, qubit readouts, a combination thereof, and/or the like. Additionally, the parameterization performed by the parameterization component 902 is not limited to the example noise parameters. For example, in one or more embodiments the parameterization component 902 can parameterize the Pauli noise with regards to noise parameters for each individual gate, and/or additional parameters to bias the Pauli noise (e.g., Pauli Z errors can be biased more heavily than Pauli X errors).

Additionally, the trace component 904 can trace Pauli faults through the syndrome extraction circuit of the quantum circuit to identify error-sensitive events triggered by each Pauli fault. Where a Pauli fault triggers one or more error-sensitive events, then the Pauli fault can contribute its probability to an edge of the decoding graph in terms of the one or more physical noise parameters. For example, an edge probability on the decoding graph can be the sum of probabilities of the one or more Pauli fault triggers. Thereby, the trace component 904 can determine a probability $p_e$ for each edge e of the decoding graph, and set a weight value equal to $-\log(p_e/(1-p_e))$.

Further, in various embodiments the tuning component 906 can tune the noise parameters to improve the decoding of a given dataset. For example, rather than equating the physical noise parameters with estimated noise (e.g., from randomized benchmarking); the tuning component 906 can tune the physical noise parameters to optimize the logical error rate. In one or more embodiments, the tuning component 906 can employ one or more optimization algorithms including, but not limited to: a gradient descent algorithm, a Monte Carlo sampling algorithm, a Nelder-Mead algorithm, a combination thereof, and/or the like. For instance, given the parameterization performed by the parameterization component 902, the tuning component 906 can execute the QEC code 122 on the given dataset to determine the logical error rate. Further, the tuning component 906 can execute the QEC code 122 with various noise parameter settings to determine which settings achieve the lowest logical error rate. Compared to randomized benchmarking estimates, optimized parameters can achieve better logical error rates. In one or more embodiments, the tuning component 906 can account for noise discrepancies between the theorized model and the observed model via multiple executions of the QEC code 122 on the quantum circuit hardware of the one or more quantum computers 108 with various settings in accordance with an optimization algorithm.

Figure 10:
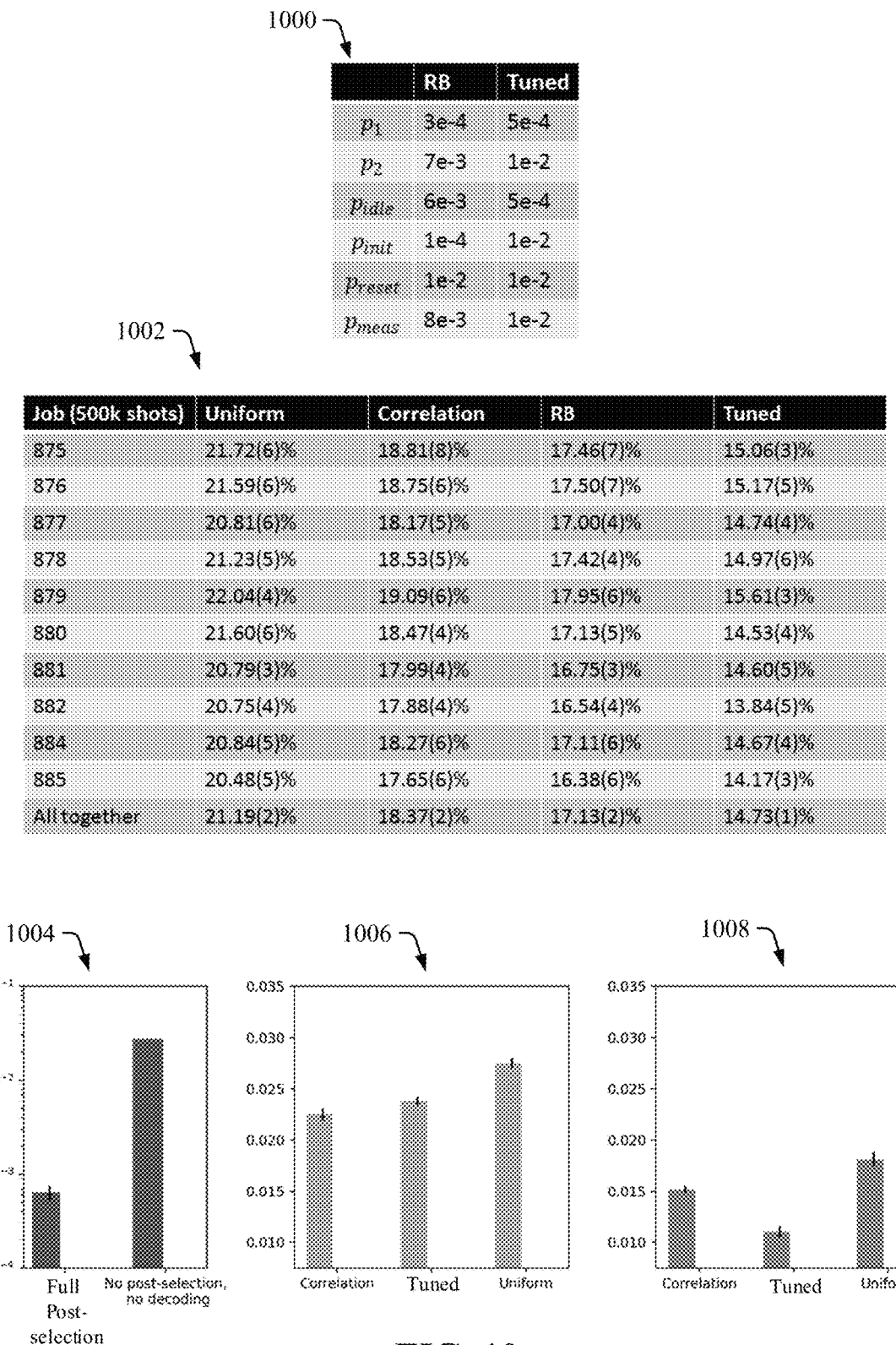
FIG. 10 illustrates diagrams of example, non-limiting, tables and graphs that can demonstrate the efficacy of a tune analytic decoder component and/or correlation inversion decoder component at determining edge probabilities in accordance with one or more embodiments described herein.

FIG. 10 illustrates a diagram of example, non-limiting tables 1000, 1002 and/or graphs 1004, 1006, and/or 1008 that can demonstrate the efficacy of the tuned analytic decoder component 114 and/or correlation inversion decoder component 112 in accordance with one or more embodiments described herein. Repetitive description of like elements employed in other embodiments described herein is omitted for the sake of brevity. As shown in FIG. 10: "uniform" can represent a quantum decoder that utilizes uniform edge weights in the decoding graph; "correlation" can represent the correlation inversion decoder component 112; "RB" can represent an untuned decoder that utilizes randomized benchmarking to estimate noise parameters; and/or "tuned" can represent the tuned analytic decoder component 114.

Table 1000 can compare the values of various noise parameters (e.g., single-qubit gates $p_1$, two-qubit gates $p_2$, idle locations $p_{idle}$, qubit initializations $p_{init}$, resets $p_{reset}$, and/or measurements $p_{meas}$) between a quantum decoder that employs randomized benchmarking ("RB") to determine parameter values and the tuned analytic decoder component 114, which can tune the parameter values via one or more optimization algorithms. Table 1002 depicts experiment data (e.g., logical error rate expressed as a percentage) from various executions (e.g., "Job") of heavy hexagon code with a distance value of 3 and 3 cycles of syndrome measurement data.

Graphs 1004, 1006, and/or 1008 can depict the logical errors per cycle initially in $|-/+\rangle_L$ states under various methods with acceptance probability per cycle. Additionally, graphs 1004, 1006, and/or 1008 compare decoder performance on up to 10 cycles of the [[4,1,2]] code. Graph 1004 can regard executions in which no decoding was performed and full post-selection (e.g., represented by "full") and no post-selection (e.g., represented by "none") methods were employed. As shown in graph 1004, 25.5% of the counts were rejected with each cycle for the full post selection scheme.

Figures 11A, 11B:
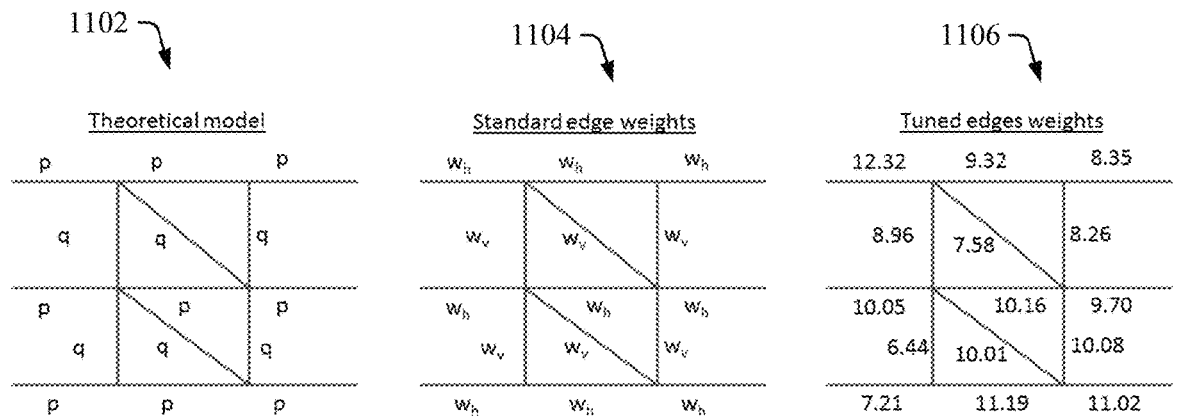
FIGS. 11A-B illustrate diagrams of example, non-limiting, decoding graphs and experiment data for a noise model to demonstrate the applicability of the tuned analytic decoder component on various models in accordance with one or more embodiments described herein.

FIGS. 11A-11B illustrate diagrams regarding example, non-limiting decoding graphs 1102, 1104, and/or 1106 for theoretical noise models that can be tuned by the tuned analytic decoder component 114 in accordance with one or more embodiments described herein. Repetitive description of like elements employed in other embodiments described herein is omitted for the sake of brevity. As exemplified in FIGS. 11A-11B, the tuned analytic decoder component 114 can be employed on models other than circuit noise models. For instance, the decoding graphs depicted in FIG. 11A regard a theoretical noise model relevant to a 3-bit repetition code, where failures can be represented by a path that connects left and right boundaries. For instance, the tuned analytic decoder component 114 can be employed to tune the edge weights of decoding graphs used in one or more quantum experiment simulations.

Decoding graph 1102 can characterize the theoretical noise model in which the edges are assigned uniform, or substantially uniform, probabilities. For instances, edges labeled "p" can be assigned a 5% probability, and edges labeled "q" can be assigned a 10% probability. Decoding graph 1104 can characterize the theoretical noise model in which edges are assigned standard weights defined by Equations 4 and/or 5 below.

$$w_h = -\log\left(\frac{p_h}{1-p_h}\right) \quad (4)$$

$$w_v = -\log\left(\frac{p_v}{1-p_v}\right) \quad (5)$$

Decoding graph 1106 can characterize the theoretical noise model in which the edge weights are tuned by the tuned analytic decoder component 114 in accordance with various embodiments described herein by optimizing low degree approximation to logical failure probability (e.g., subject to correcting first order errors).

FIG. 11B depicts the logical error rate resulting from decoding via decoding graph 1104 ("standard") and decoding graph 1106 ("tuned"). As shown in FIG. 11B, employing the tuned analytic decoder component 114 to tune the edge weights of the decoding graph can achieve fewer failure occurrences. For example, the tuned analytic decoder component 114 can correct one or more second order errors than the decoder that utilizes standardized weights; thereby the tuned analytic decoder component 114 can achieve an improved failure probability.

Figure 12:
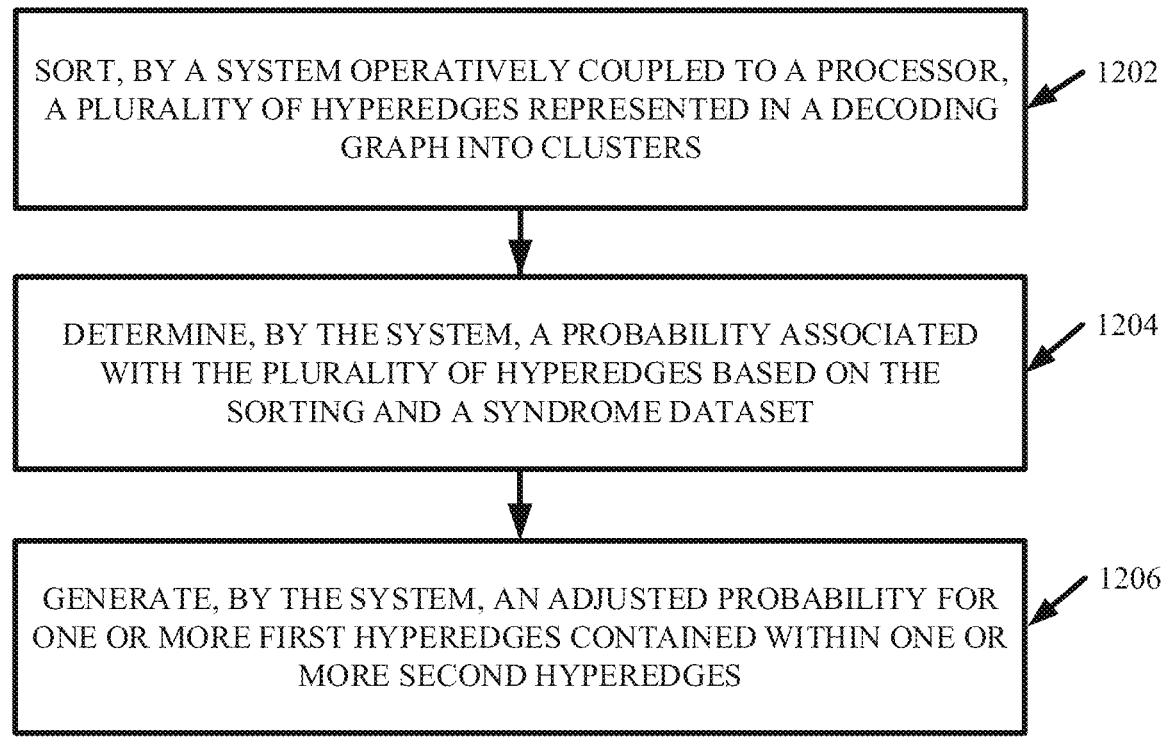
FIG. 12 illustrates a flow diagram of an example, non-limiting, computer-implemented method that can be employed to analyze experiment data and determine a set of edge probabilities likely to have produced the data in accordance with one or more embodiments described herein.

FIG. 12 illustrates a flow diagram of an example, non-limiting computer-implemented method 1200 that can be implemented by the correlation inversion decoder component 112 in accordance with one or more embodiments described herein. Repetitive description of like elements employed in other embodiments described herein is omitted for the sake of brevity. In various embodiments, the computer-implemented method 1200 can facilitate calibrating one or more quantum decoder algorithms for decoding one or more QEC codes 122 by estimating hyperedge probabilities of a decoding hypergraph that can be consistent with a syndrome dataset (e.g., a measurement dataset observed from execution of a quantum algorithm on quantum circuit hardware).

At 1202, the computer-implemented method 1200 can comprise sorting (e.g., via cluster component 202), by a system 100 operatively coupled to a processor 120, a plurality of hyperedges represented in one or more decoding graphs into clusters. In accordance with various embodiments described herein, the one or more hyperedges can represent one or more error-sensitive events triggered by one or more Pauli errors. Further, the sorting at 1202 can be based on size (e.g., where the hyperedges are sorted from largest to smallest into clusters).

At 1204, the computer-implemented method 1200 can comprise determining (e.g., via invert component 204), by the system 100, one or more probabilities associated with the plurality of hyperedges based on the sorting at 1202 and/or one or more syndrome datasets. In various embodiments, the determining at 1204 can be performed in accordance with at least Equations 1-2. At 1206, the computer-implemented method 1200 can comprise generating (e.g., via adjustment component 206), by the system 100, one or more adjusted probabilities for one or more hyperedges contained within one or more second hyperedges. For example, the plurality of hyperedges can comprise a first hyperedge sorted into a first cluster and a second hyperedge (e.g., a larger hyperedge) sorted into a second cluster. The second hyperedge can contain the first hyperedge (e.g., the first and second hyperedges can overlap on the decoding hypergraph). The adjusting at 1206 can comprise subtracting the probability associated with the second hyperedge (e.g., determined when solving the probability for the second cluster) from the probability associated with the first hyperedge (e.g., determined when solving the probability for the first cluster).

Figure 13:
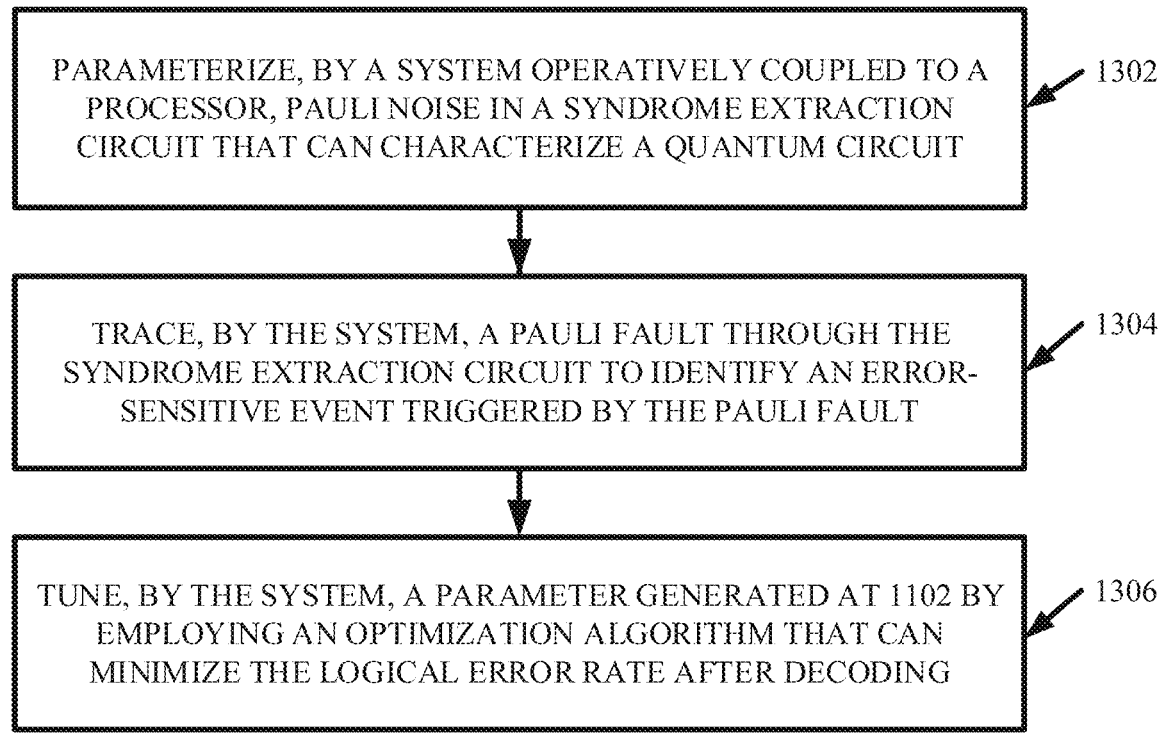
FIG. 13 illustrates a flow diagram of an example, non-limiting, computer-implemented method that can be employed to calculate one or more edge weights of a decoder graph in terms of Pauli error rate parameters in accordance with one or more embodiments described herein.

FIG. 13 illustrates a flow diagram of an example, non-limiting computer-implemented method 1300 that can be implemented by the tuned analytic decoder component 114 in accordance with one or more embodiments described herein. Repetitive description of like elements employed in other embodiments described herein is omitted for the sake of brevity. In various embodiments, the computer-implemented method 1300 can be employed to tune one or more quantum decoder algorithms for a QEC code 122 by tracing single Pauli faults through a quantum circuit to determine an edge probability of a decoding graph as a function of a logical error rate.

At 1302, the computer-implemented method 1300 can comprise parameterizing (e.g., via parameterization component 902), by a system 100 operatively coupled to a processor 120, Pauli noise in one or more syndrome extraction circuits that can characterize one or more quantum circuits. For example, the parameterizing at 1302 can employ one or more Pauli error models to parameterize one or more physical noise parameters.

At 1304, the computer-implemented method 1300 can comprise tracing (e.g., via trace component 904), by the system 100, one or more Pauli faults through the syndrome extraction circuit to identify one or more error-sensitive events that can be triggered by the one or more Pauli faults. For example, the tracing at 1304 can employ a Pauli depolarizing noise model in accordance with various embodiments described herein. At 1306, the computer-implemented method 1300 can comprise tuning (e.g., via tuning component 906), by the system 100, one or more parameters generated at 1302 by employing one or more optimization algorithms (e.g., a gradient descent algorithm) that can minimize the logical error rate after decoding.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
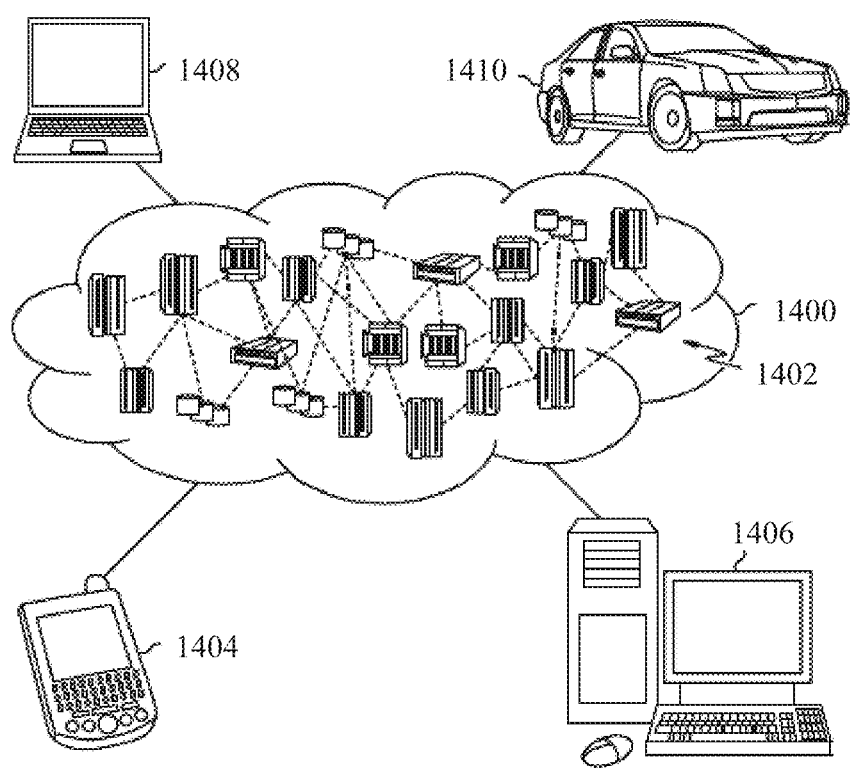
FIG. 14 depicts a cloud computing environment in accordance with one or more embodiments described herein.

Referring now to FIG. 14, illustrative cloud computing environment 1400 is depicted. As shown, cloud computing environment 1400 includes one or more cloud computing nodes 1402 with which local computing devices used by cloud consumers, such as, for example, personal digital assistant (PDA) or cellular telephone 1404, desktop computer 1406, laptop computer 1408, and/or automobile computer system 1410 may communicate. Nodes 1402 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1404-1410 shown in FIG. 14 are intended to be illustrative only and that computing nodes 1402 and cloud computing environment 1400 can communicate with any type of computerized device over any type of network and/or network addressable connection (e.g., using a web browser).

Figure 15:
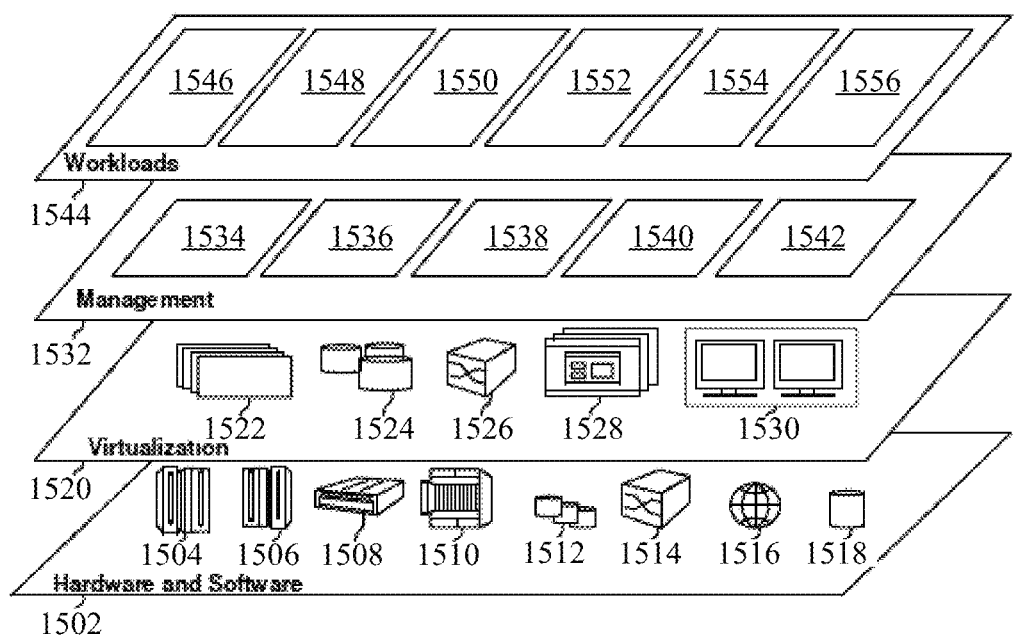
FIG. 15 depicts abstraction model layers in accordance with one or more embodiments described herein.

Referring now to FIG. 15, a set of functional abstraction layers provided by cloud computing environment 1400 (FIG. 14) is shown. Repetitive description of like elements employed in other embodiments described herein is omitted for the sake of brevity. It should be understood in advance that the components, layers, and functions shown in FIG. 15 are intended to be illustrative only and embodiments of the invention are not limited thereto. As depicted, the following layers and corresponding functions are provided.

Hardware and software layer 1502 includes hardware and software components. Examples of hardware components include: mainframes 1504; RISC (Reduced Instruction Set Computer) architecture based servers 1506; servers 1508; blade servers 1510; storage devices 1512; and networks and networking components 1514. In some embodiments, software components include network application server software 1516 and database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530.

In one example, management layer 1532 may provide the functions described below. Resource provisioning 1534 provides dynamic procurement of computing resources and other resources that are utilized to perform tasks within the cloud computing environment. Metering and Pricing 1536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provide pre-arrangement for, and procurement of, cloud computing resources for which a future requirement is anticipated in accordance with an SLA.

Workloads layer 1544 provides examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and edge probability estimation 1556. Various embodiments of the present invention can utilize the cloud computing environment described with reference to FIGS. 12 and 15 to collect measurement data and/or implement one or more calibration and/or tuning procedures of a quantum decoder algorithm for a QEC code 122.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 16:
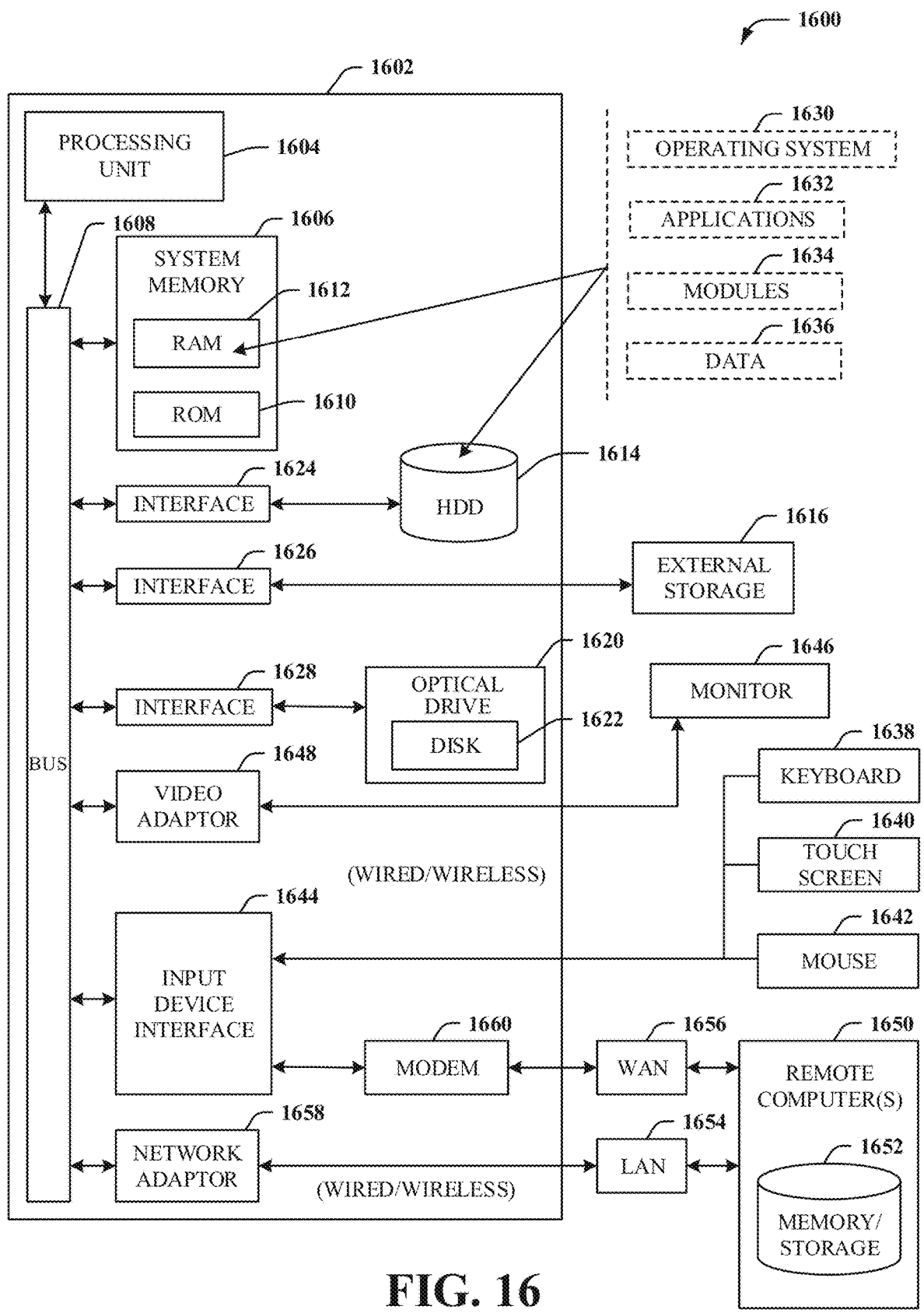
FIG. 16 illustrates a block diagram of an example, non-limiting, operating environment in which one or more embodiments described herein can be facilitated.

In order to provide additional context for various embodiments described herein, FIG. 16 and the following discussion are intended to provide a general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system ("BIOS") can be stored in a non-volatile memory such as ROM, erasable programmable read only memory ("EPROM"), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive ("HDD") 1614 (e.g., EIDE, SATA), one or more external storage devices 1616 (e.g., a magnetic floppy disk drive ("FDD") 1616, a memory stick or flash drive reader, a memory card reader, a combination thereof, and/or the like) and an optical disk drive 1620 (e.g., which can read or write from a CD-ROM disc, a DVD, a BD, and/or the like). While the internal HDD 1614 is illustrated as located within the computer 1602, the internal HDD 1614 can also be configured for external use in a suitable chassis (not shown). Additionally, while not shown in environment 1600, a solid state drive ("SSD") could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus ("USB") and Institute of Electrical and Electronics Engineers ("IEEE") 1594 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine ("VM") of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1602, e.g., applied at the application execution level or at the operating system ("OS") kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, and/or the like.

A monitor 1646 or other type of display device can be also connected to the system bus 1608 via an interface, such as a video adapter 1648. In addition to the monitor 1646, a computer typically includes other peripheral output devices (not shown), such as speakers, printers, a combination thereof, and/or the like.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network ("LAN") 1654 and/or larger networks, e.g., a wide area network ("WAN") 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point ("AP") disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory, wherein the computer executable components comprise:
a correlation inversion decoder component that calibrates a quantum decoder algorithm for a quantum error-correcting code by estimating hyperedge probabilities of a decoding hypergraph that are consistent with a syndrome dataset, wherein the hyperedge probabilities represent correlated triggers of one or more quantum circuit faults.

2. The system of claim 1, further comprising:
a cluster component that sorts a plurality of hyperedges represented in the decoding hypergraph into clusters based on size.

3. The system of claim 2, wherein error-sensitive events are linear combinations of syndrome measurement bits that equal zero in an ideal quantum circuit operation.

4. The system of claim 2, further comprising:
an invert component that determines a probability associated with the plurality of hyperedges based on the sorting by the cluster component.

5. The system of claim 4, wherein the plurality of hyperedges comprise a first hyperedge sorted into a first cluster and a second hyperedge that contains the first hyperedge and is sorted into a second cluster, and wherein the system further comprises:
an adjustment component that generates an adjusted probability of the first hyperedge by subtracting a probability associated with the second hyperedge from a probability associated with the first hyperedge.

6. A system, comprising:
a memory that stores computer executable components; and
a processor, operably coupled to the memory, and that executes the computer executable components stored in the memory, wherein the computer executable components comprise:
a tuned analytic decoder component that tunes a quantum decoder algorithm for a quantum error-correcting code by tracing single Pauli faults through a quantum circuit to determine an edge probability of a decoding graph as a function of a logical error rate; and
a parameterization component that parameterizes Pauli noise present in a syndrome extraction circuit.

7. The system of claim 6, further comprising:
a trace component that traces a Pauli fault through the syndrome extraction circuit to identify an error-sensitive event triggered by the Pauli fault.

8. The system of claim 7, wherein the error sensitive event can be represented by the edge probability.

9. The system of claim 7, further comprising:
a tuning component that tunes the parameterization by employing an optimization algorithm that minimizes the logical error rate after decoding.

10. A computer-implemented method, comprising:
calibrating, by a system operatively coupled to a processor, a quantum decoder algorithm for a quantum error-correcting code by estimating hyperedge probabilities of a decoding hypergraph that are consistent with a syndrome dataset, wherein the hyperedge probabilities represent correlated triggers of one or more quantum circuit faults.

11. The computer-implemented method of claim 10, further comprising:
sorting, by the system, a plurality of hyperedges represented in the decoding hypergraph into clusters based on size.

12. The computer-implemented method of claim 11, wherein error-sensitive events are linear combinations of syndrome measurement bits that equal zero in an ideal quantum circuit operation.

13. The computer-implemented method of claim 11, further comprising:
determining, by the system, a probability associated with the plurality of hyperedges based on the sorting.

14. The computer-implemented method of claim 13, wherein the plurality of hyperedges comprise a first hyperedge sorted into a first cluster and a second hyperedge that contains the first hyperedge and is sorted into a second cluster, and wherein the computer-implemented method further comprises:
generating, by the system, an adjusted probability of the first hyperedge by subtracting a probability associated with the second hyperedge from a probability associated with the first hyperedge.

15. A computer-implemented method, comprising:
tuning, by a system operatively coupled to a processor, a quantum decoder algorithm for a quantum error-correcting code by tracing single Pauli faults through a quantum circuit to determine an edge probability of a decoding graph as a function of a logical error rate; and
parameterizing, by the system, Pauli noise present in a syndrome extraction circuit.

16. The computer-implemented method of claim 15, further comprising:
tracing, by the system, a Pauli fault through the syndrome extraction circuit to identify an error-sensitive event triggered by the Pauli fault.

17. The computer-implemented method of claim 16, wherein the error sensitive event can be represented by the edge probability.

18. The computer-implemented method of claim 16, further comprising:
tuning, by the system, the parameterizing by employing an optimization algorithm that minimizes the logical error rate after decoding.

19. A computer program product for calibrating a quantum decoder, the computer program product comprising a computer readable storage medium having program instructions embodied therewith, the program instructions executable by a processor to cause the processor to:
calibrate a quantum decoder algorithm for a quantum error-correcting code by estimating hyperedge probabilities of a decoding graph that are consistent with a syndrome dataset, wherein the hyperedge probabilities represent correlated triggers of one or more quantum circuit faults.

20. The computer program product of claim 19, wherein the program instructions further cause the processor to:
sort a plurality of hyperedges represented in the decoding graph into clusters based on size.

21. The computer program product of claim 20, the error-sensitive events are linear combinations of syndrome measurement bits that equal zero in an ideal quantum circuit operation.

22. The computer program product of claim 20, wherein the program instructions further cause the processor to:
determine a probability associated with the plurality of hyperedges based on the sorting of the plurality of hyperedges.

23. The computer program product of claim 22, wherein the plurality of hyperedges comprise a first hyperedge sorted into a first cluster and a second hyperedge that contains the first hyperedge and is sorted into a second cluster, and wherein the program instructions further cause the processor to:
generate an adjusted probability of the first hyperedge by subtracting a probability associated with the second hyperedge from a probability associated with the first hyperedge.

* * * * *